US012772230B2

(12) United States Patent
Homchaudhuri et al.

(10) Patent No.: US 12,772,230 B2
(45) Date of Patent: Oct. 20, 2026

(54) ADAPTIVE NEIGHBOR AWARENESS NETWORKING (NAN) DATA INTERFACE

(71) Applicant: QUALCOMM INCORPORATED, San Diego, CA (US)

(72) Inventors: Sandip Homchaudhuri, San Jose, CA (US); Sudhanshu Singh, Hyderabad (IN); Kenneth Marvin Gainey, Escondido, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 18/260,390

(22) PCT Filed: Feb. 9, 2022

(86) PCT No.: PCT/US2022/015859

§ 371 (c)(1),
(2) Date: Jul. 5, 2023

(87) PCT Pub. No.: WO2022/173859

PCT Pub. Date: Aug. 18, 2022

(65) Prior Publication Data

US 2024/0057062 A1 Feb. 15, 2024

(30) Foreign Application Priority Data

Feb. 11, 2021 (IN) ............................. 202121005858

(51) Int. Cl.
*H04W 72/12* (2023.01)
*H04W 72/52* (2023.01)

(52) U.S. Cl.
CPC .......... *H04W 72/12* (2013.01); *H04W 72/52* (2023.01)

(58) Field of Classification Search
CPC . H04W 52/0232; H04W 72/02; H04W 72/12; H04W 72/52; H04W 84/12; H04W 84/18
(Continued)

(56) References Cited

U.S. PATENT DOCUMENTS 9,143,979 B1 9/2015 Lambert
10,051,469 B2 8/2018 Abraham et al.
(Continued)

FOREIGN PATENT DOCUMENTS

CN 1918866 A 2/2007
WO WO-2016131196 A1 8/2016
(Continued)

OTHER PUBLICATIONS

International Search Report and Written Opinion—PCT/US2022/015859—ISA/EPO—May 6, 2022 (2101509WO).
(Continued)

*Primary Examiner* — Ayman A Abaza
(74) *Attorney, Agent, or Firm* — Holland & Hart LLP

(57) ABSTRACT

This disclosure provides methods, devices and systems for reducing power consumption in neighbor awareness networking (NAN) devices. Some implementations more specifically relate to dynamically adjusting a NAN device link (NDL) schedule to reduce the idle duration of a NAN data interface (NDI). The NDL schedule identifies a number of NAN slots, per discovery window (DW) interval, during which an NDL is available for data communications between NAN devices. In some aspects, a NAN device may measure congestion on the wireless channel during each NAN slot within a DW interval and may dynamically update the NDL schedule based on the measured congestion. In some other aspects, a NAN device may measure throughput
(Continued)

on the NDL during each NAN slot within a DW interval and may dynamically update the NDL schedule based on the measured throughput.

22 Claims, 14 Drawing Sheets

(58) Field of Classification Search
USPC .......................................................... 370/235
See application file for complete search history.

(56) References Cited

U.S. PATENT DOCUMENTS

| | | | |
|---|---|---|---|
| 2015/0249972 A1 | 9/2015 | You et al. | |
| 2016/0157089 A1 | 6/2016 | Qi et al. | |
| 2017/0245296 A1 | 8/2017 | Huang et al. | |
| 2017/0317938 A1* | 11/2017 | Abraham .......... | H04W 52/0212 |
| 2018/0054782 A1 | 2/2018 | Qi et al. | |
| 2018/0098183 A1* | 4/2018 | Qi ........................... | H04W 8/22 |
| 2019/0357053 A1* | 11/2019 | Kurian .................. | H04W 16/04 |

FOREIGN PATENT DOCUMENTS

| | | |
|---|---|---|
| WO | WO-2016154202 A1 | 9/2016 |
| WO | WO-2017123893 | 7/2017 |

OTHER PUBLICATIONS

Wi-Fi Alliance: "Neighbor Awareness Networking Specification Version 3.1", Jan. 15, 2020 (Jan. 15, 2020), XP055658906, 214 Pages, Retrieved from the Internet: URL: https://www.wi-fi.org [retrieved on Jan. 17, 2020] Sections 6.2.3.4, 5.2.2.

Taiwan Search Report—TW111104903—TIPO—May 31, 2025 (2101509TW).

* cited by examiner

ADAPTIVE NEIGHBOR AWARENESS NETWORKING (NAN) DATA INTERFACE

CROSS-REFERENCE TO RELATED APPLICATIONS

The present Application is a 371 national stage filing of International PCT Application No. PCT/US2022/015859 by HOMCHAUDHURI et al. entitled "ADAPTIVE NEIGHBOR AWARENESS NETWORKING (NAN) DATA INTERFACE," filed Feb. 9, 2022; and claims priority to Indian Patent Application No. 202121005858 by HOMCHAUDHURI et al. entitled "ADAPTIVE NEIGHBOR AWARENESS NETWORKING (NAN) DATA INTERFACE," filed Feb. 11, 2021, each of which is assigned to the assignee hereof, and each of which is expressly incorporated by reference in its entirety herein.

TECHNICAL FIELD

This disclosure relates generally to wireless communication, and more specifically, to adaptively configuring a neighbor awareness networking (NAN) data interface (NDI) to be used for wireless communications.

DESCRIPTION OF THE RELATED TECHNOLOGY

Neighbor awareness networking (NAN) is a wireless communication technology that leverages wireless communication protocols defined by the IEEE 802.11 family of standards to support the formation of peer-to-peer (P2P) networks (also referred to as "NAN clusters") among wireless communication devices. Unlike infrastructure networks (such as wireless local area networks (WLANs)), which rely on intermediary nodes (such as access points (APs)) to manage communications between client devices, a NAN-capable device (also referred to as a "NAN device") can directly discover and communicate with other NAN devices participating in a NAN cluster. As a result, NAN devices may discover and join NAN clusters based on physical context and individual preferences, for example, to provide a more personalized user experience.

A NAN cluster may be formed by two or more NAN devices that are synchronized to a common discovery window (DW) schedule. During each DW, NAN devices participating in the NAN cluster may advertise or request various services. NAN devices that share a common application may establish a data connection over a NAN device link (NDL). An NDL includes a set of common resource blocks (CRBs) that can be used for data communications between a pair of NAN devices. Each NDL is associated with a respective NDL schedule which indicates times at which the CRBs are available for use by the NAN devices. A pair of NAN devices may establish a NAN data path (NDP) to communicate over an NDL. An NDP is a data connection between a pair of NAN data interfaces (NDIs) each belonging to a respective NAN device.

NAN devices participating in an NDP must be available for data communications during the times indicated by the NDL schedule. More specifically, the NDIs of the NAN devices must remain active for the indicated durations, even if they are not transmitting or receiving data. For example, when an NDI is not transmitting or receiving data, the NDI is actively listening for incoming data on the NDL. As a result, NAN devices may consume significant amounts of power idling (neither transmitting nor receiving data) on an NDL.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include establishing a neighbor awareness networking (NAN) device link (NDL), over a wireless channel, with a NAN device; negotiating, with the NAN device, an NDL schedule indicating a number of NAN slots, per discovery window (DW) interval, during which the NDL is available for data communications with the NAN device; measuring congestion on the wireless channel during each of a plurality of NAN slots within a DW interval, where the congestion measured during each NAN slot is associated with an amount of time ($T_{busy}$) that the wireless channel is busy during the respective NAN slot; and dynamically updating the NDL schedule based on the congestion measured during the plurality of NAN slots.

In some implementations, the method may further include measuring throughput on the NDL during each of the plurality of NAN slots, where the throughput measured during each NAN slot is associated with an amount of time ($T_{load}$) that the wireless communication device communicates with the NAN device, over the NDL, during the respective NAN slot, and where the dynamic updating of the NDL schedule is further based on the throughput measured during the plurality of NAN slots. In some aspects, the dynamic updating of the NDL schedule may include adjusting the number of NAN slots, per DW interval, during which the NDL is available for data communications with the NAN device based on a covariance of $T_{busy}$ and $T_{load}$.

In some aspects, the adjusting of the number of NAN slots may include increasing the number of NAN slots based on the covariance of $T_{busy}$ and $T_{load}$ being a negative value. In some other aspects, the adjusting of the number of NAN slots may include reducing the number of NAN slots based on the covariance of $T_{busy}$ and $T_{load}$ being a positive value and an average idle duration of the NDL being greater than a threshold value. In some implementations, the congestion and throughput measured during each of the plurality of NAN slots may indicate an amount of time (Tate) that the wireless channel is idle during the respective NAN slot, where the average idle duration of the NDL is equal to a mean of $T_{idle}$.

In some other implementations, the dynamic updating of the NDL schedule may include obtaining the number of NAN slots, per DW interval, during which the NDL is available for data communications with the NAN device based on a joint estimation metric associated with $T_{busy}$ and $T_{load}$. In some implementations, the number of NAN slots may be obtained from a look-up table (LUT) that stores a plurality of values associated with the joint estimation metric and information indicating a respective number of NAN slots associated with each of the plurality of values.

In some implementations, the dynamic updating of the NDL schedule may include adjusting a periodicity of the NAN slots, per DW interval, during which the NDL is available for data communications with the NAN device based on a standard deviation of $T_{load}$. In some aspects, the adjusting of the periodicity of the NAN slots may include increasing the periodicity of the NAN slots based on $T_{load}$ being less than or equal to the standard deviation of $T_{load}$. In some other aspects, the adjusting of the periodicity of the NAN slots may include reducing the periodicity of the NAN slots based on $T_{load}$ being greater than the standard deviation of $T_{load}$.

In some implementations, the method may further include listening for incoming data from the NAN device during one or more NAN slots not indicated by the NDL schedule. In some aspects, the dynamic updating of the NDL schedule may include adjusting the number of NAN slots, per DW interval, during which the NDL is available for data communications with the NAN device based on detecting incoming data from the NAN device during the one or more NAN slots not indicated by the NDL schedule.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including establishing an NDL, over a wireless channel, with a NAN device; negotiating, with the NAN device, an NDL schedule indicating a number of NAN slots, per DW interval, during which the NDL is available for data communications with the NAN device; measuring congestion on the wireless channel during each of a plurality of NAN slots within a DW interval, where the congestion measured during each NAN slot is associated with an amount of time that the wireless channel is busy during the respective NAN slot; and dynamically updating the NDL schedule based on the congestion measured during the plurality of NAN slots.

Another innovative aspect of the subject matter described in this disclosure can be implemented as a method of wireless communication. The method may be performed by a wireless communication device, and may include establishing an NDL, over a wireless channel, with a NAN device; negotiating, with the NAN device, an NDL schedule indicating a number of NAN slots, per DW interval, during which the NDL is available for data communications with the NAN device; measuring throughput on the NDL during each of a plurality of NAN slots within a DW interval, where the throughput measured during each NAN slot is associated with an amount of time ($T_{load}$) that the wireless communication device communicates with the NAN device, over the NDL, during the respective NAN slot; and dynamically updating the NDL schedule based on the throughput measured during the plurality of NAN slots.

In some implementations, the method may further include measuring congestion on a wireless channel associated with the NDL during each of the plurality of NAN slots, where the congestion measured during each NAN slot is associated with an amount of time ($T_{busy}$) that the wireless channel is busy during the respective NAN slot, and where the dynamic updating of the NDL schedule is further based on the throughput measured during the plurality of NAN slots. In some aspects, the updating of the NDL schedule may include adjusting the number of NAN slots, per DW interval, during which the NDL is available for data communications with the NAN device based on a covariance of $T_{busy}$ and $T_{load}$.

In some aspects, the adjusting of the number of NAN slots may include increasing the number of NAN slots based on the covariance of $T_{busy}$ and $T_{load}$ being a negative value. In some other aspects, the adjusting of the number of NAN slots may include reducing the number of NAN slots based on the covariance of $T_{busy}$ and $T_{load}$ being a positive value and an average idle duration of the NDL being greater than a threshold value. In some implementations, the congestion and throughput measured during each of the plurality of NAN slots may indicate an amount of time (Tate) that the wireless channel is idle during the respective NAN slot, where the average idle duration of the NDL is equal to a mean of $T_{idle}$.

In some other implementations, the dynamic updating of the NDL schedule may include obtaining the number of NAN slots, per DW interval, during which the NDL is available for data communications with the NAN device based on a joint estimation metric associated with $T_{busy}$ and $T_{load}$. In some implementations, the number of NAN slots may be obtained from an LUT that stores a plurality of values associated with the joint estimation metric and information indicating a respective number of NAN slots associated with each of the plurality of values.

In some implementations, the dynamic updating of the NDL schedule may include adjusting a periodicity of the NAN slots, per DW interval, during which the NDL is available for data communications with the NAN device based on a standard deviation of $T_{load}$. In some aspects, the adjusting of the periodicity of the NAN slots may include increasing the periodicity of the NAN slots based on $T_{load}$ being less than or equal to the standard deviation of $T_{load}$. In some other aspects, the adjusting of the periodicity of the NAN slots may include reducing the periodicity of the NAN slots based on $T_{load}$ being greater than the standard deviation of $T_{load}$.

In some implementations, the method may further include listening for incoming data from the NAN device during one or more NAN slots not indicated by the NDL schedule. In some aspects, the dynamic updating of the NDL schedule may include adjusting the number of NAN slots, per DW interval, during which the NDL is available for data communications with the NAN device based on detecting incoming data from the NAN device during the one or more NAN slots not indicated by the NDL schedule.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including establishing an NDL, over a wireless channel, with a NAN device; negotiating, with the NAN device, an NDL schedule indicating a number of NAN slots, per DW interval, during which the NDL is available for data communications with the NAN device; measuring throughput on the NDL during each of a plurality of NAN slots within a DW interval, where the throughput measured during each NAN slot is associated with an amount of time ($T_{load}$) that the wireless communication device communicates with the NAN device, over the NDL, during the respective NAN slot; and dynamically updating the NDL schedule based on the throughput measured during the plurality of NAN slots.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
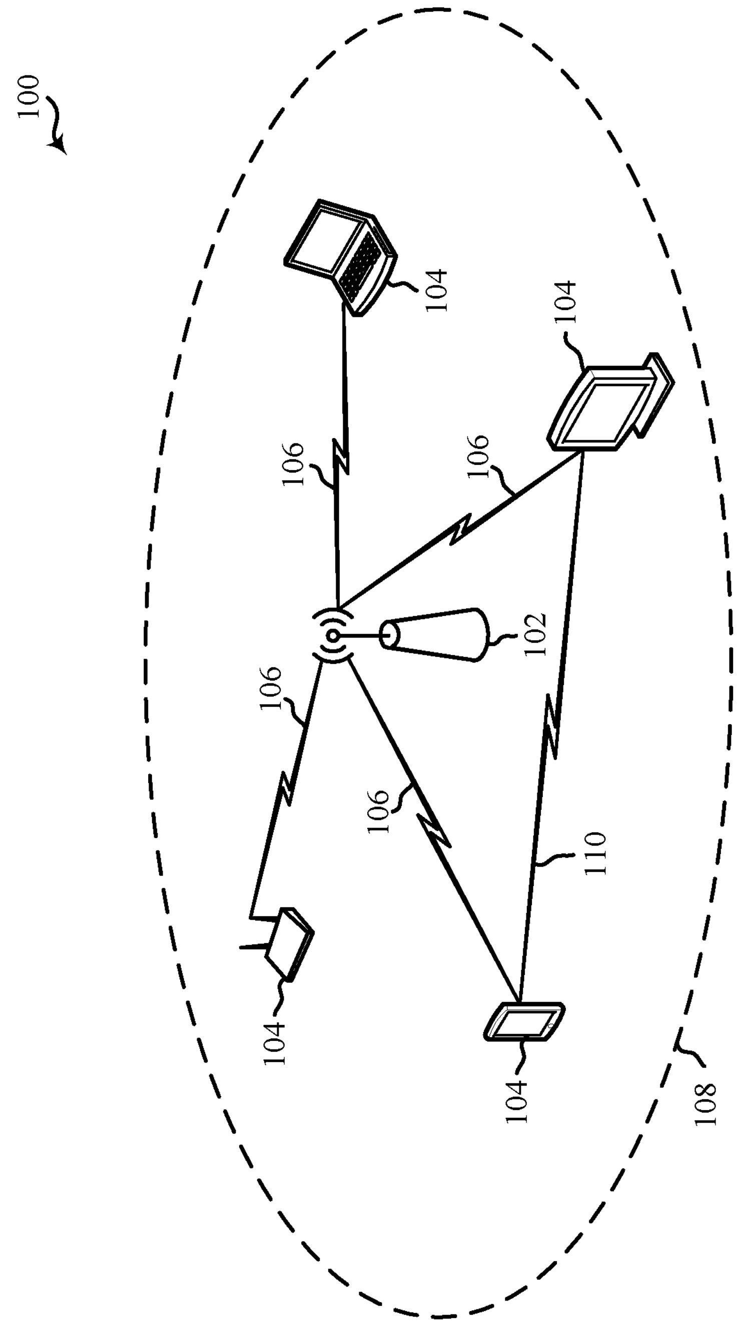
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to reducing power consumption in neighbor awareness networking (NAN) devices, and more particularly, to dynamically adjusting a NAN device link (NDL) schedule to reduce the idle duration of a NAN data interface (NDI). The NDL schedule identifies a number of NAN slots (representing blocks of time), per discovery window (DW) interval, during which an NDL is available for data communications between NAN devices. In some aspects, a NAN device may measure congestion on the wireless channel during each NAN slot within a DW interval and may dynamically update the NDL schedule based on the measured congestion. For example, the congestion measured during each NAN slot may be associated with an amount of time ($T_{busy}$) that the wireless channel is busy (or otherwise unavailable for data communications between the NAN devices) during the respective NAN slot. In some other aspects, a NAN device may measure throughput on the NDL during each NAN slot within a DW interval and may dynamically update the NDL schedule based on the measured throughput. For example, the throughput measured during each NAN slot may be associated with an amount of time ($T_{load}$) that the NAN devices communicate over the NDL during the respective NAN slot. Still further, in some aspects, a NAN device may dynamically update the NDL schedule based on a combination of $T_{busy}$ and $T_{load}$. For example, if $T_{busy}$ and $T_{load}$ are relatively low, and have a positive covariance, the NAN device may reduce the number of NAN slots, per DW interval, during which the NDL can be used for future data communications. As another example, the NAN device may calculate a joint estimation metric (C2) based on $T_{busy}$ and $T_{load}$ and may determine the number of NAN slots, per DW interval, based on the value of C2.

Particular implementations of the subject matter described in this disclosure can be implemented to realize one or more of the following potential advantages. The present implementations enable NAN devices to adapt the power consumption of their NDIs to the throughput and latency of data transmitted and received by the NDIs. For example, if a NAN device determines that an NDI is idle (active but not transmitting or receiving data) for relatively long periods of time, the NAN device may reduce the number of NAN slots available for data communications (per DW interval). By reducing the number of available NAN slots, the idle duration of each NDI also may be reduced, thereby optimizing the power consumption of the NAN device. Aspects of the present disclosure recognize that, in some instances, low data throughput may be caused by high levels of noise, interference, or wireless communications between other devices (collectively referred to as "congestion") on the wireless medium. The covariance, or any other joint metric, of $T_{busy}$ and $T_{load}$ indicates whether variations in data throughput may be linked to variations in congestion. Thus, by dynamically updating the NDL schedule based on $T_{busy}$ and $T_{load}$, the NAN device can more accurately tailor the number of available NAN slots to the throughput and latency of data communications over the NDL.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the physical (PHY) and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

Some APs and STAs may be configured to implement spatial reuse techniques. For example, APs and STAs configured for communications using IEEE 802.11ax or 802.11be may be configured with a BSS color. APs associated with different BSSs may be associated with different BSS colors. If an AP or a STA detects a wireless packet from another wireless communication device while contending for access, the AP or STA may apply different contention parameters based on whether the wireless packet is transmitted by, or transmitted to, another wireless communication device within its BSS or from a wireless communication device from an overlapping BSS (OBSS), as determined by a BSS color indication in a preamble of the wireless packet. For example, if the BSS color associated with the wireless packet is the same as the BSS color of the AP or STA, the AP or STA may use a first received signal strength indication (RSSI) detection threshold when performing a CCA on the wireless channel. However, if the BSS color associated with the wireless packet is different than the BSS color of the AP or STA, the AP or STA may use a second RSSI detection threshold in lieu of using the first RSSI detection threshold when performing the CCA on the wireless channel, the second RSSI detection threshold being greater than the first RSSI detection threshold. In this way, the requirements for winning contention are relaxed when interfering transmissions are associated with an OBSS.

Figure 2A:
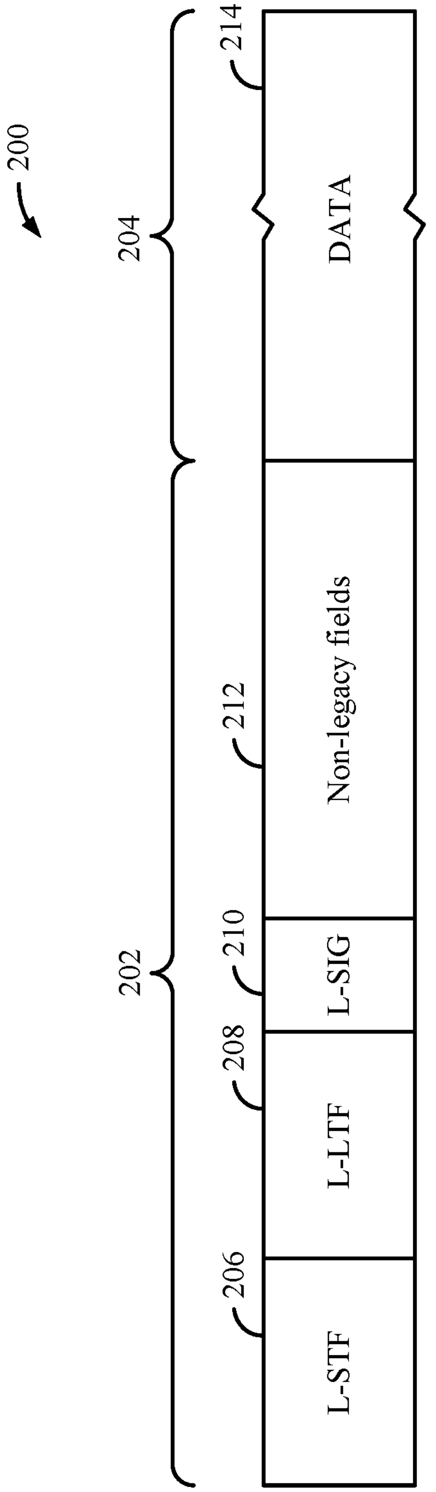
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PLCP service data unit (PSDU) including a data field (DATA) 214 that, in turn, may carry higher layer data, for example, in the form of medium access control (MAC) protocol data units (MPDUs) or an aggregated MPDU (A-MPDU).

Figure 2B:
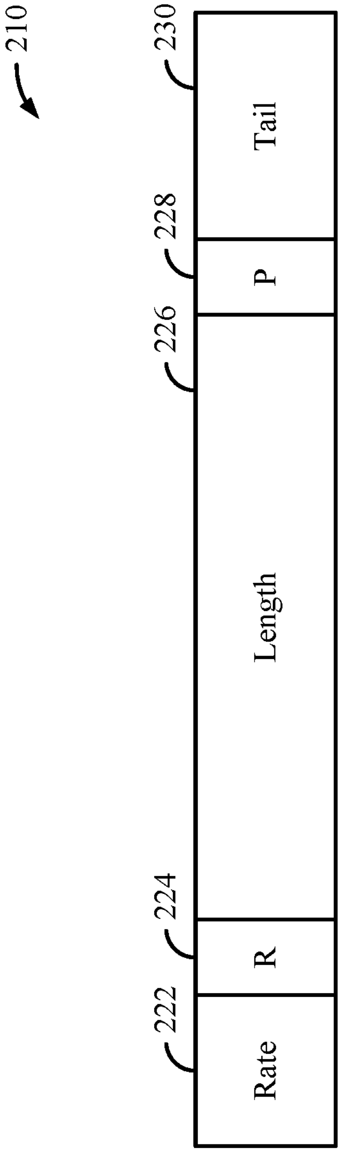
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
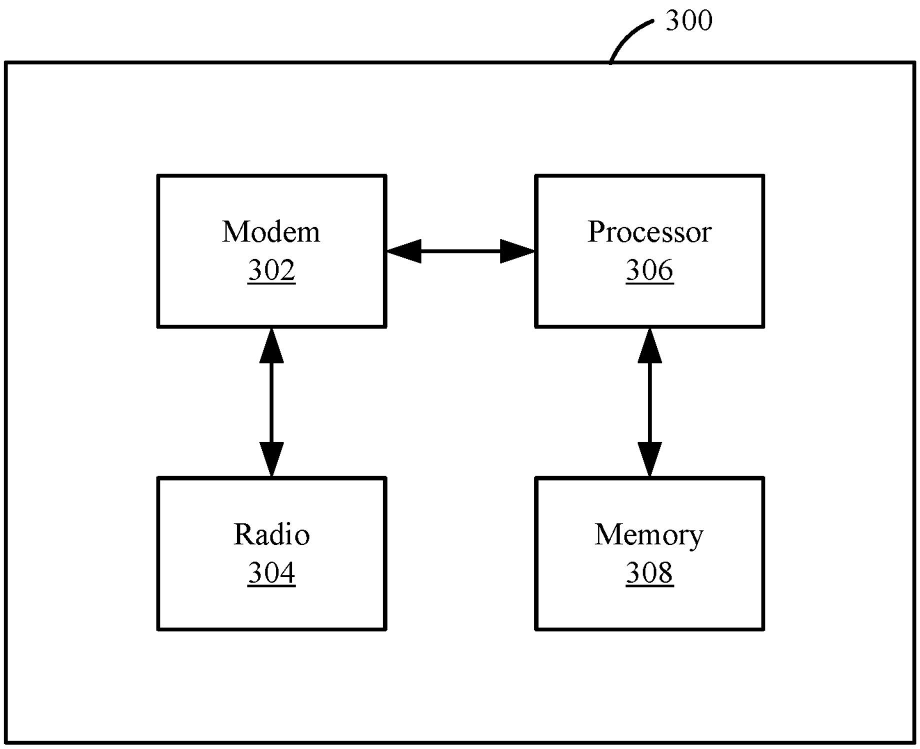
FIG. 3 shows a block diagram of an example wireless communication device.

FIG. 3 shows a block diagram of an example wireless communication device 300. In some implementations, the wireless communication device 300 can be an example of a device for use in a STA such as one of the STAs 104 described with reference to FIG. 1. In some implementations, the wireless communication device 300 can be an example of a device for use in an AP such as the AP 102 described with reference to FIG. 1. The wireless communication device 300 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 300 can be, or can include, a chip, system on chip (SoC), chipset, package or device that includes one or more modems 302, for example, a Wi-Fi (IEEE 802.11 compliant) modem. In some implementations, the one or more modems 302 (collectively "the modem 302") additionally include a WWAN modem (for example, a 3GPP 4G LTE or 5G compliant modem). In some implementations, the wireless communication device 300 also includes one or more radios 304 (collectively "the radio 304"). In some implementations, the wireless communication device 306 further includes one or more processors, processing blocks or processing elements 306 (collectively "the processor 306") and one or more memory blocks or elements 308 (collectively "the memory 308").

The modem 302 can include an intelligent hardware block or device such as, for example, an application-specific integrated circuit (ASIC) among other possibilities. The modem 302 is generally configured to implement a PHY layer. For example, the modem 302 is configured to modulate packets and to output the modulated packets to the radio 304 for transmission over the wireless medium. The modem 302 is similarly configured to obtain modulated packets received by the radio 304 and to demodulate the packets to provide demodulated packets. In addition to a modulator and a demodulator, the modem 302 may further include digital signal processing (DSP) circuitry, automatic gain control (AGC), a coder, a decoder, a multiplexer and a demultiplexer. For example, while in a transmission mode, data obtained from the processor 306 is provided to a coder, which encodes the data to provide encoded bits. The encoded bits are then mapped to points in a modulation constellation (using a selected modulation and coding scheme (MCS)) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 304. In implementations involving beamforming, the modulated symbols in the respective spatial streams are precoded via a steering matrix prior to their provision to the IFFT block.

While in a reception mode, digital signals received from the radio 304 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 306) for processing, evaluation or interpretation.

The radio 304 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 300 can include, or be coupled with, multiple transmit antennas (each with a corresponding transmit chain) and multiple receive antennas (each with a corresponding receive chain). The symbols output from the modem 302 are provided to the radio 304, which then transmits the symbols via the coupled antennas. Similarly, symbols received via the antennas are obtained by the radio 304, which then provides the symbols to the modem 302.

The processor 306 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 306 processes information received through the radio 304 and the modem 302, and processes information to be output through the modem 302 and the radio 304 for transmission through the wireless medium. For example, the processor 306 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 306 may generally control the modem 302 to cause the modem to perform various operations described above.

The memory 308 can include tangible storage media such as random-access memory (RAM) or read-only memory (ROM), or combinations thereof. The memory 308 also can store non-transitory processor- or computer-executable software (SW) code containing instructions that, when executed by the processor 306, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 4A:
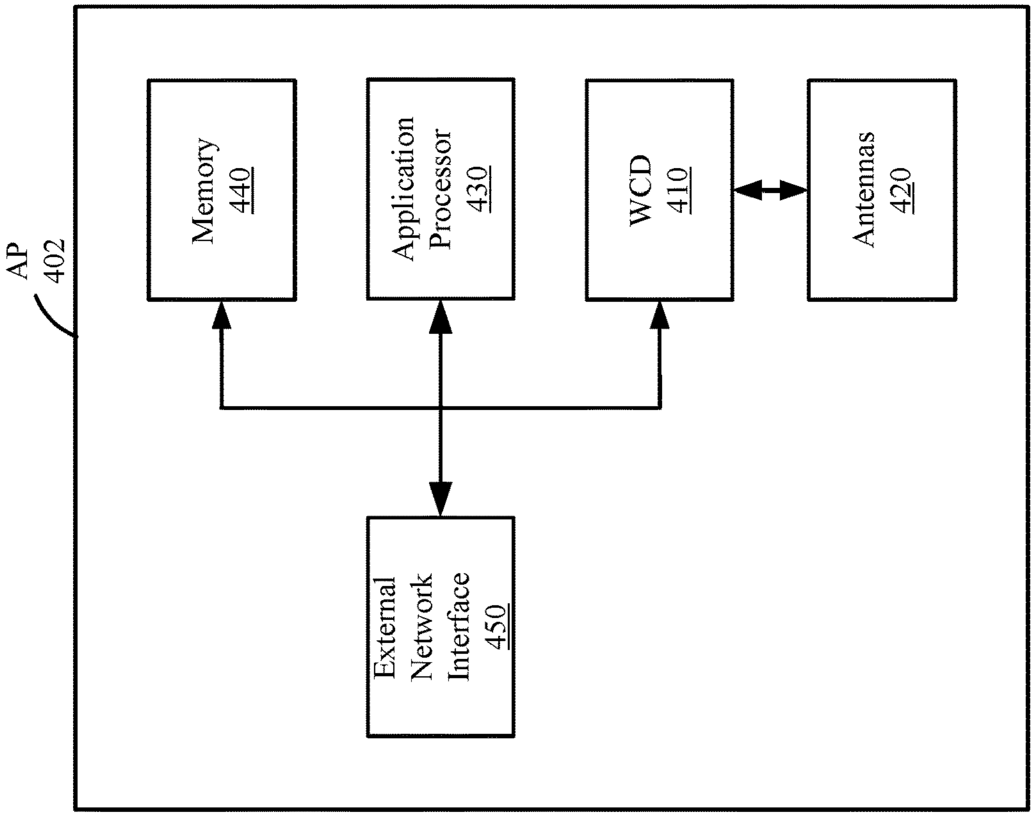
FIG. 4A shows a block diagram of an example AP.

FIG. 4A shows a block diagram of an example AP 402. For example, the AP 402 can be an example implementation of the AP 102 described with reference to FIG. 1. The AP 402 includes a wireless communication device (WCD) 410 (although the AP 402 may itself also be referred to generally as a wireless communication device as used herein). For example, the wireless communication device 410 may be an example implementation of the wireless communication device 300 described with reference to FIG. 3. The AP 402 also includes multiple antennas 420 coupled with the wireless communication device 410 to transmit and receive wireless communications. In some implementations, the AP 402 additionally includes an application processor 430 coupled with the wireless communication device 410, and a memory 440 coupled with the application processor 430. The AP 402 further includes at least one external network interface 450 that enables the AP 402 to communicate with a core network or backhaul network to gain access to external networks including the Internet. For example, the external network interface 450 may include one or both of a wired (for example, Ethernet) network interface and a wireless network interface (such as a WWAN interface). Ones of the aforementioned components can communicate with other ones of the components directly or indirectly, over at least one bus. The AP 402 further includes a housing that encompasses the wireless communication device 410, the application processor 430, the memory 440, and at least portions of the antennas 420 and external network interface 450.

Figure 4B:
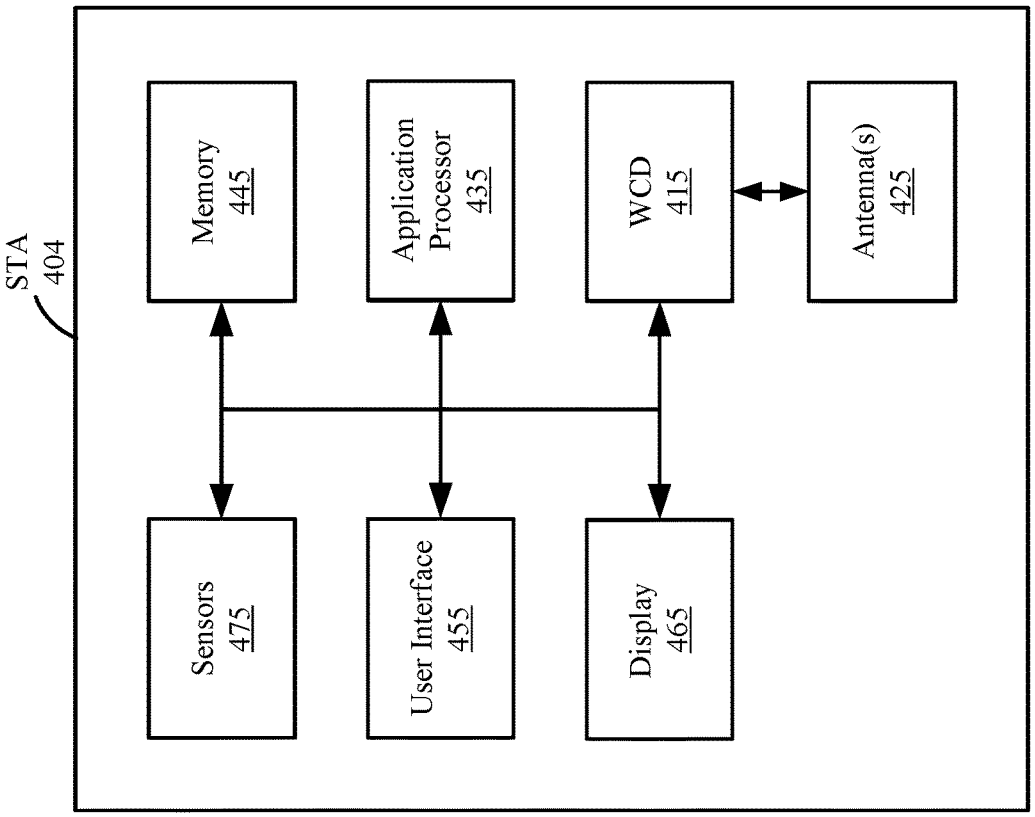
FIG. 4B shows a block diagram of an example STA.

FIG. 4B shows a block diagram of an example STA 404. For example, the STA 404 can be an example implementation of the STA 104 described with reference to FIG. 1. The STA 404 includes a wireless communication device 415 (although the STA 404 may itself also be referred to generally as a wireless communication device as used herein). For example, the wireless communication device 415 may be an example implementation of the wireless communication device 300 described with reference to FIG. 3. The STA 404 also includes one or more antennas 425 coupled with the wireless communication device 415 to transmit and receive wireless communications. The STA 404 additionally includes an application processor 435 coupled with the wireless communication device 415, and a memory 445 coupled with the application processor 435. In some implementations, the STA 404 further includes a user interface (UI) 455 (such as a touchscreen or keypad) and a display 465, which may be integrated with the UI 455 to form a touchscreen display. In some implementations, the STA 404 may further include one or more sensors 475 such as, for example, one or more inertial sensors, accelerometers, temperature sensors, pressure sensors, or altitude sensors. Ones of the aforementioned components can communicate with other ones of the components directly or indirectly, over at least one bus. The STA 404 further includes a housing that encompasses the wireless communication device 415, the application processor 435, the memory 445, and at least portions of the antennas 425, UI 455, and display 465.

Figure 5:
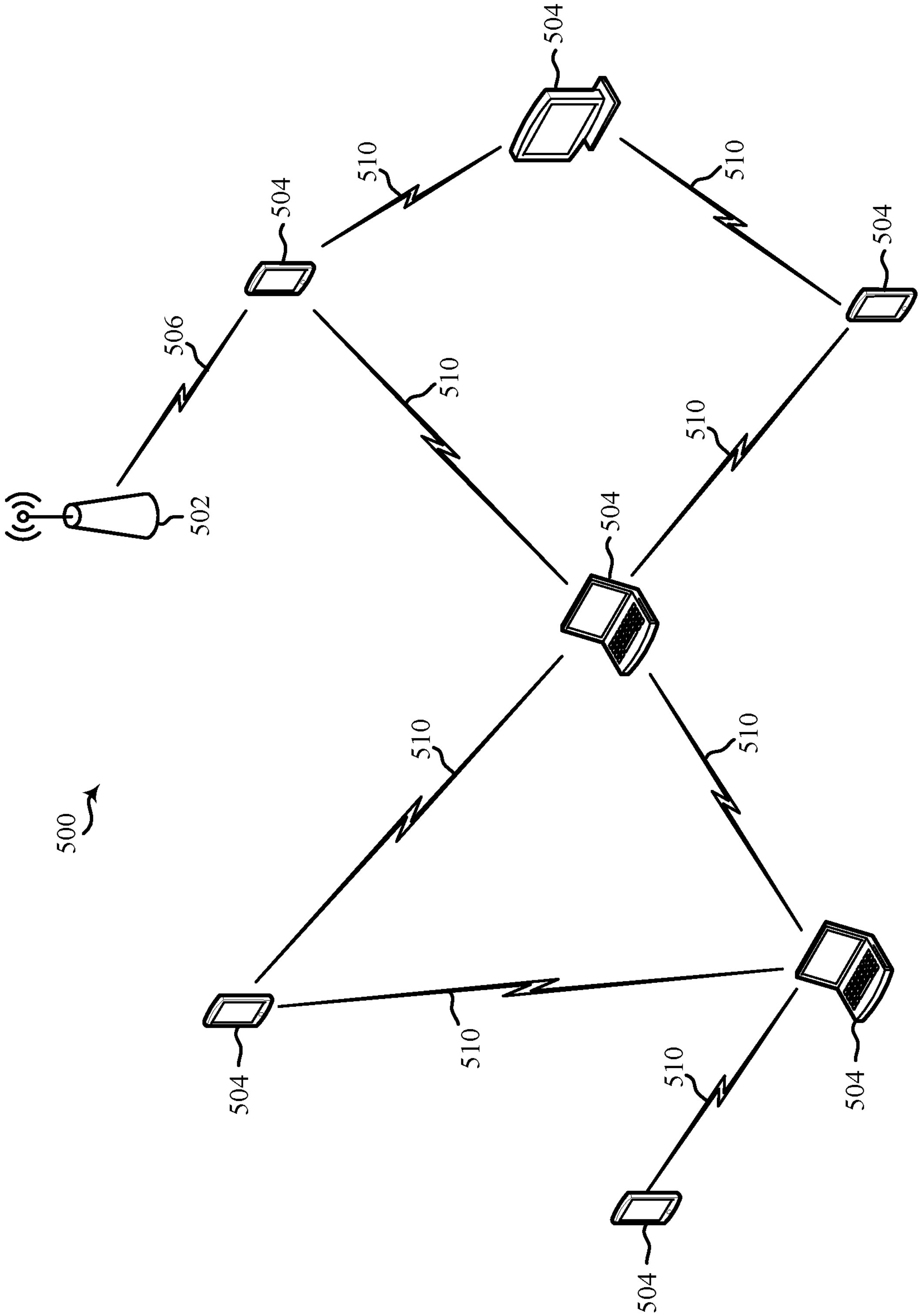
FIG. 5 shows a pictorial diagram of another example wireless communication network.

FIG. 5 shows a pictorial diagram of another example wireless communication network 500. According to some aspects, the wireless communication network 500 can be an example of a WLAN. For example, the wireless network 500 can be a network implementing at least one of the IEEE 802.11 family of standards. The wireless network 500 may include multiple STAs 504. As described above, each of the STAs 504 also may be referred to as a mobile station (MS), a mobile device, a mobile handset, a wireless handset, an access terminal (AT), a user equipment (UE), a subscriber station (SS), or a subscriber unit, among other examples. The STAs 504 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

The wireless network 500 is an example of a peer-to-peer (P2P), ad hoc or mesh network. STAs 504 can communicate directly with each other via P2P wireless links 510 (without the use of an intermediary AP). In some implementations, the wireless network 500 is an example of a neighbor awareness networking (NAN) network. NAN networks operate in accordance with the Wi-Fi Alliance (WFA) Neighbor Awareness Networking (also referred to as NAN) standard specification. NAN-compliant STAs 504 (hereinafter also simply "NAN devices 504") transmit and receive NAN communications (for example, in the form of Wi-Fi packets including frames conforming to an IEEE 802.11 wireless communication protocol standard such as that defined by the IEEE 802.11-2016 specification or amendments thereof including, but not limited to, 802.11ay, 802.11ax, 802.11az, 802.11ba and 802.11be) to and from one another via wireless P2P links 510 (hereinafter also referred to as "NAN links") using a data packet routing protocol, such as Hybrid Wireless Mesh Protocol (HWMP), for path selection.

A NAN network generally refers to a collection of NAN devices that share a common set of NAN parameters including: the time period between consecutive discovery windows (DWs), the time duration of the discovery windows, the NAN beacon interval, and the NAN discovery channel (s). A NAN ID is an identifier signifying a specific set of NAN parameters for use within the NAN network. NAN networks are dynamically self-organized and self-configured. NAN devices 504 in the network automatically establish an ad-hoc network with other NAN devices 504 such that network connectivity can be maintained. Each NAN device 504 is configured to relay data for the NAN network such that various NAN devices 504 may cooperate in the distribution of data within the network. As a result, a message can be transmitted from a source NAN device to a destination NAN device by being propagated along a path, hopping from one NAN device to the next until the destination is reached.

Each NAN device 504 is configured to transmit two types of beacons: NAN discovery beacons and NAN synchronization beacons. When a NAN device 504 is turned on, or otherwise when NAN-functionality is enabled, the NAN device periodically transmits NAN discovery beacons (for example, every 100 time units (TUs), every 128 TUs, or another suitable period) and NAN synchronization beacons (for example, every 512 TUs or another suitable period). Discovery beacons are management frames, transmitted between DWs, used to facilitate the discovery of NAN clusters. A NAN cluster is a collection of NAN devices within a NAN network that are synchronized to the same clock and DW schedule using a time synchronization function (TSF). To join NAN clusters, NAN devices 504 passively scan for discovery beacons from other NAN devices. When two NAN devices 504 come within a transmission range of one another, they will discover each other based on such discovery beacons. Respective master preference values determine which of the NAN devices 504 will become the master device. If a NAN cluster is not discovered, a NAN device 504 may start a new NAN cluster. When a NAN device 504 starts a NAN cluster, it assumes the master role and broadcasts a discovery beacon. Additionally, a NAN device may choose to participate in more than one NAN cluster within a NAN network.

The NAN devices 504 in a NAN cluster are synchronized to a particular DW schedule—the times and channel on which the NAN devices converge. The interval between successive DWs (512 TUs) is referred to as a "DW interval." Each DW interval is further subdivided into a number (32) of "NAN slots" of equal duration (16 TUs). For example, a DW may coincide with the first NAN slot (or the first 16 TUs) of a respective DW interval. At the beginning of each DW, one or more NAN devices 504 may transmit a NAN synchronization beacon, which is a management frame used to synchronize the timing of the NAN devices within the NAN cluster to that of the master device. The NAN devices 504 may then transmit multicast or unicast NAN service discovery frames directly to other NAN devices within the service discovery threshold and in the same NAN cluster during the discovery window. The service discovery frames indicate services supported by the respective NAN devices 504.

In some instances, NAN devices 504 may exchange service discovery frames to ascertain whether both devices support ranging operations. NAN devices 504 may perform such ranging operations ("ranging") during the DWs. The ranging may involve an exchange of fine timing measurement (FTM) frames (such as those defined in IEEE 802.11-REVmc). For example, a first NAN device 504 may transmit unicast FTM requests to multiple peer NAN devices 504. The peer NAN devices 504 may then transmit responses to the first NAN device 504. The first NAN device 504 may then exchange FTM frames with each of the peer NAN devices 504. The first NAN device 504 may then determine a range between itself and each of the peer devices 504 based on the FTM frames and transmit a range indication to each of the peer NAN devices 504. For example, the range indication may include a distance value or an indication as to whether a peer NAN device 504 is within a service discovery threshold (for example, 3 meters (m)) of the first NAN device 504. NAN links between NAN devices within the same NAN cluster may persist over multiple discovery windows as long as the NAN devices remain within the service discovery thresholds of one another and synchronized to the anchor master of the NAN cluster.

Some NAN devices 504 also may be configured for wireless communication with other networks such as with a Wi-Fi WLAN or a wireless (for example, cellular) wide area network (WWAN), which may, in turn, provide access to external networks including the Internet. For example, a NAN device 504 may be configured to associate and communicate, via a Wi-Fi or cellular link 506, with an AP or base station 502 of a WLAN or WWAN network, respectively. In such instances, the NAN device 504 may include software-enabled access point (SoftAP) functionality enabling the STA to operate as a Wi-Fi hotspot to provide other NAN devices 504 with access to the external networks via the associated WLAN or WWAN backhaul. Such a NAN device 504 (referred to as a NAN concurrent device) is capable of operating in both a NAN network as well as another type of wireless network, such as a Wi-Fi BSS. In some such implementations, a NAN device 504 may, in a service discovery frame, advertise an ability to provide such access point services to other NAN devices 504.

There are two general NAN service discovery messages: publish messages and subscribe messages. Generally, publishing is a mechanism for an application on a NAN device to make selected information about the capabilities and services of the NAN device available to other NAN devices, while subscribing is a mechanism for an application on a NAN device to gather selected types of information about the capabilities and services of other NAN devices. A NAN device may generate and transmit a subscribe message when requesting other NAN devices operating within the same NAN cluster to provide a specific service. For example, in an active subscriber mode, a subscribe function executing within the NAN device may transmit a NAN service discovery frame to actively seek the availability of specific services. A publish function executing within a publishing NAN device capable of providing a requested service may, for example, transmit a publish message to reply to the subscribing NAN device responsive to the satisfaction of criteria specified in the subscribe message. The publish message may include a range parameter indicating the service discovery threshold, which represents the maximum distance at which a subscribing NAN device can avail itself of the services of the publishing NAN device. A NAN also may use a publish message in an unsolicited manner, for example, a publishing NAN device may generate and transmit a publish message to make its services discoverable for other NAN devices operating within the same NAN cluster. In a passive subscriber mode, the subscribe function does not initiate the transfer of any subscribe message, rather, the subscribe function looks for matches in received publish messages to determine the availability of desired services.

NAN devices that share a common application may establish a data connection over a NAN device link (NDL). An NDL includes a set of common resource blocks (CRBs) that can be used for data communications between a pair of NAN devices. Each NDL is associated with a respective NDL schedule which indicates times at which the CRBs are available for use by the NAN devices. For example, the NDL schedule may identify a set of NAN slots, per DW interval, during which the NDL is available. A pair of NAN devices may establish a NAN data path (NDP) to communicate over an NDL. An NDP is a data connection between a pair of NAN data interfaces (NDIs) each belonging to a respective NAN device. Once an NDP is established, each NAN device participating in the NDP must be available for data communications during the times indicated by the NDL schedule. For example, if the NDL schedule associated with an NDP indicates that the first four NAN slots of a DW interval can be used for data communications between a pair of NAN devices, each of the NAN devices must be available to transmit or receive data over the NDL during the first four NAN slots of each DW interval.

As described above, NAN devices participating in an NDP must be available for data communications during the times indicated by the NDL schedule. More specifically, the NDIs of the NAN devices must remain active for the indicated durations, even if they are not transmitting or receiving data. For example, when an NDI is not transmitting or receiving data, the NDI is actively listening for incoming data on the NDL. As a result, NAN devices may consume significant amounts of power idling on an NDL.

Various aspects relate generally to reducing power consumption in NAN devices, and more particularly, to dynamically adjusting an NDL schedule to reduce the idle duration of an NDI. In some aspects, a NAN device may measure congestion on the wireless channel during each NAN slot within a DW interval and may dynamically update the NDL schedule based on the measured congestion. For example, the congestion measured during each NAN slot may be associated with an amount of time ($T_{busy}$) that the wireless channel is busy (or otherwise unavailable for data communications between the NAN devices) during the respective NAN slot. In some other aspects, a NAN device may measure throughput on the NDL during each NAN slot within a DW interval and may dynamically update the NDL schedule based on the measured throughput. For example, the throughput measured during each NAN slot may be associated with an amount of time ($T_{load}$) that the NAN devices communicate over the NDL during the respective NAN slot. Still further, in some aspects, a NAN device may dynamically update the NDL schedule based on a combination of $T_{busy}$ and $T_{load}$. For example, if $T_{busy}$ and $T_{load}$ are relatively low, and have a positive covariance, the NAN device may reduce the number of NAN slots, per DW interval, during which the NDL can be used for future data communications. As another example, the NAN device may calculate a joint estimation metric (C2) based on $T_{busy}$ and $T_{load}$ and may determine the number of NAN slots, per DW interval, based on the value of C2.

Particular implementations of the subject matter described in this disclosure can be implemented to realize one or more of the following potential advantages. The present implementations enable NAN devices to adapt the power consumption of their NDIs to the throughput and latency of data transmitted and received by the NDIs. For example, if a NAN device determines that an NDI is idle (active but not transmitting or receiving data) for relatively long periods of time, the NAN device may reduce the number of NAN slots available for data communications (per DW interval). By reducing the number of available NAN slots, the idle duration of each NDI also may be reduced, thereby optimizing the power consumption of the NAN device. Aspects of the present disclosure recognize that, in some instances, low data throughput may be caused by high levels of noise, interference, or wireless communications between other devices (collectively referred to as "congestion") on the wireless medium. The covariance, or any other joint metric, of $T_{busy}$ and $T_{load}$ indicates whether variations in data throughput may be linked to variations in congestion. Thus, by dynamically updating the NDL schedule based on $T_{busy}$ and $T_{load}$, the NAN device can more accurately tailor the number of available NAN slots to the throughput and latency of data communications over the NDL.

Figure 6:
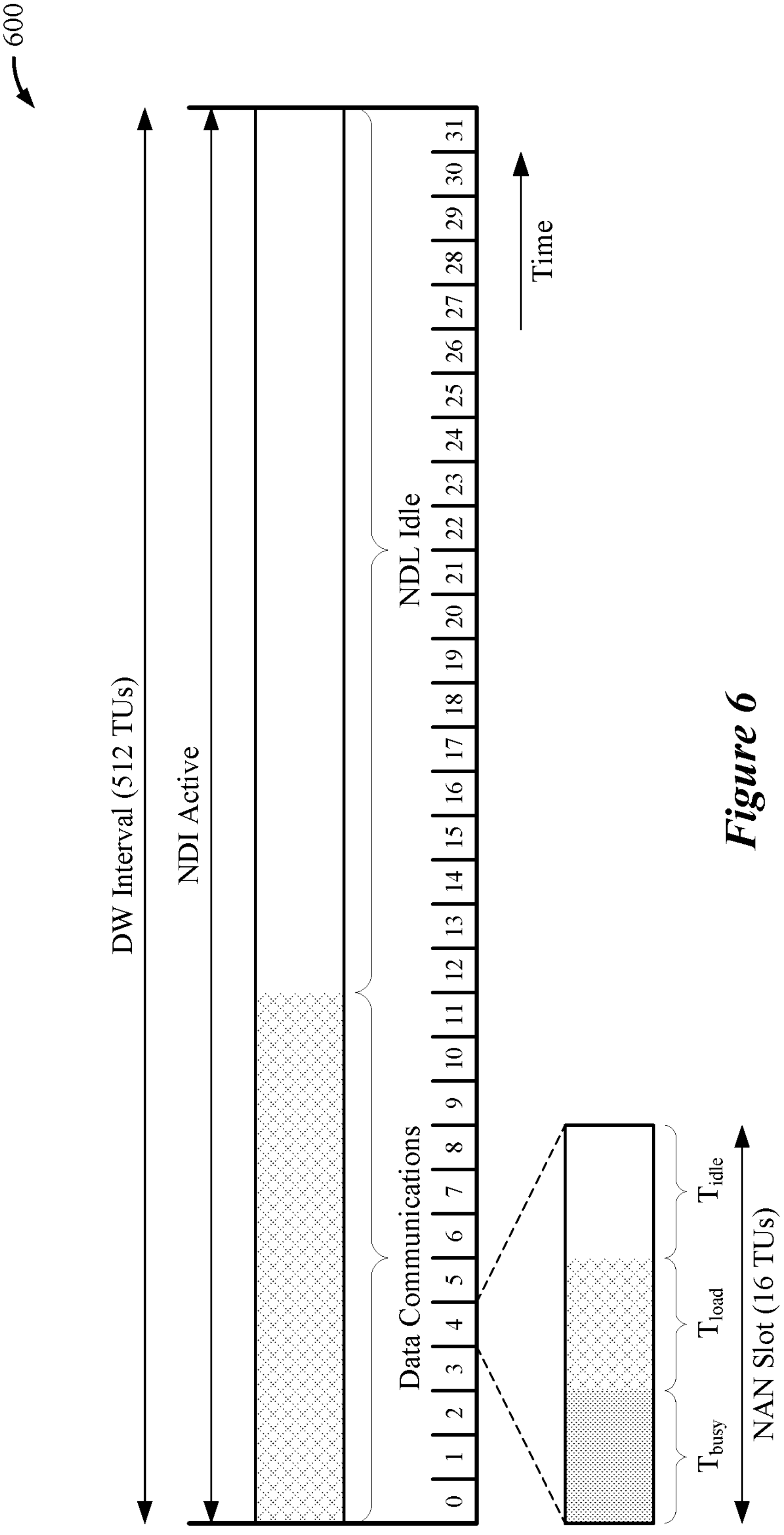
FIG. 6 shows a timing diagram depicting an example neighbor awareness networking (NAN) device link (NDL) schedule.

FIG. 6 shows a timing diagram 600 depicting an example NDL schedule. The NDL schedule indicates a set of NAN slots, within a DW interval (512 TUs), during which an NDL can be used for data communications between a pair of NAN devices. The example NDL schedule of FIG. 6 spans all 32 NAN slots (slots 0-31) of a DW interval. Thus, each NAN device associated with the NDL must be available to transmit or receive data communications (over the NDL) for the duration of each DW interval that the NDL schedule is in effect. Specifically, the NDIs used to transmit and receive the data communications between the NAN devices must remain active during each of the 32 NAN slots.

In the example of FIG. 6, the NAN devices exchange data communications only during the first 12 NAN slots (slots 0-11) of the DW interval, leaving the NDL idle for the remaining 20 NAN slots (slots 12-31). Because the NDIs of the NAN devices must remain active during slots 12-31 (such as by actively listening for incoming data), the NAN devices may continue to consume significant amounts of power even when the NDL is idle. Aspects of the present disclosure recognize that a NAN device can reduce its idle power consumption by reducing the number of NAN slots during which its NDI(s) must remain active (referred to herein as "active NAN slots"). With reference for example to FIG. 6, each NAN device associated with the NDL may significantly reduce (or eliminate) its idle power consumption by limiting the active NAN slots to the first 12 NAN slots (slots 0-11) of a DW interval.

In some implementations, a NAN device may dynamically update its NDL schedule based on the throughput or latency of data communications over the NDL. More specifically, the NAN device may tailor the number of active NAN slots to the amount of data exchanged within a DW interval. In some aspects, the NAN device may determine an average throughput of data communications, per DW interval, and adjust the number of active NAN slots per DW interval based on the average throughput. For example, the NAN device may monitor an amount of data it transmits and receives over the NDL, during each DW interval, and calculate the number of NAN slots required to communicate that amount of data. If the number of active NAN slots currently allocated by the NDL schedule exceeds the number of required NAN slots (by a threshold amount), the NAN device may reduce the number of active NAN slots in one or more subsequent DW intervals.

Aspects of the present disclosure further recognize that congestion (such as noise, interference, or wireless communications between other devices) on the wireless medium may affect the throughput of data communications over the NDL. Specifically, high levels of congestion may prevent a NAN device from capturing the wireless medium or otherwise transmitting data over the NDL. Thus, in some instances, low data throughput over the NDL may be attributed to high levels of congestion on the wireless medium. In such instances, reducing the number of active NAN slots may further reduce the throughput of data communications over the NDL, which may lead to a stall in data transmissions or disconnection between a pair of NAN devices.

In some implementations, a NAN device may determine how to update the NDL schedule based on the congestion on the wireless medium. More specifically, the NAN device may leverage knowledge of the congestion to better tailor the number of active NAN slots to the amount of data exchanged within a DW interval. In some aspects, the NAN device may determine an average throughput and congestion on the wireless medium, per DW interval, and adjust the number of active NAN slots per DW interval based on the average throughput and congestion. For example, the NAN device may perform clear channel assessment (CCA) on the wireless medium and determine a duration that the wireless medium is busy (indicating that the congestion exceeds a threshold level) during each DW interval. In some implementations, the NAN device may further compare variations in the measured throughput with variations in the measured congestion. For example, if increases (or decreases) in throughput coincide with increases (or decreases) in congestion, the NAN device may determine that the throughput of data communications over the NDL is not limited by congestion on the wireless medium. In some other implementations, the NAN device may consider the measured throughput and the measured congestion as a joint metric. For example, the joint metric may indicate a percentage of time that the NAN slots are occupied (or idle).

In some implementations, a NAN device may determine the throughput and congestion on the wireless medium for each NAN slot of a DW interval. With reference for example to FIG. 6, the NAN device may monitor throughput and congestion on the wireless medium during each of the 32 NAN slots (slots 0-31). In some aspects, the NAN device may determine, for each NAN slot (16 TUs), an amount of time ($T_{busy}$) during which the wireless medium busy and an amount of time ($T_{load}$) during which the NDL is used for data communications between the NAN devices. As described above, $T_{busy}$ can be determined by performing CCA on the wireless medium and $T_{load}$ can be determined by measuring the amount of data communicated over the NDL between the NAN devices. In some aspects, the NAN device also may determine, for each NAN slot, an amount of time ($T_{idle}$) during which the wireless medium is idle. In some aspects, Laic can be calculated as a function of $T_{busy}$, $T_{load}$, and the duration of each NAN slot ($T_{slot}$):

$$T_{idle} = (T_{slot} - (T_{load} + T_{busy}))$$

The NAN device may store the values of $T_{busy}$ and $T_{load}$ in an array of 32 entries, where each entry stores a respective tuple ($T_{busy}$, $T_{load}$) for one of the 32 NAN slots. In some aspects, the NAN device also may store values of $T_{idle}$ in the array. At the end of each DW interval, the NAN device may calculate a mean of $T_{busy}$ ($\overline{T_{busy}}$) and a mean of $T_{load}$ ($\overline{T_{load}}$) based on all 32 entries stored in the array. In some implementations, the NAN device also may calculate a variance of $T_{load}$ (Var($\overline{T_{load}}$)) and a covariance of $T_{busy}$ and $T_{load}$ (cov($T_{busy}$, $T_{load}$)) based on the 32 entries stored in the array. In some aspects, the values of $\overline{T_{busy}}$, $\overline{T_{load}}$, Var ($T_{load}$), and cov($T_{busy}$, $T_{load}$) may be carried over a number (N) of DW intervals. Aspects of the present disclosure recognize that $\overline{T_{busy}}$and $\overline{T_{load}}$can be used to calculate an average idle duration ($\overline{T_{idle}}$) of the NDL (based on the equation above). Aspects of the present disclosure further recognize that cov($T_{busy}$, $T_{load}$) may indicate whether Var ($\overline{T_{load}}$) is related to congestion on the wireless medium. For example, if cov($T_{busy}$, $T_{load}$) is a positive value, the NAN device may determine that the measured throughput is not tied to medium congestion. On the other hand, if cov($T_{busy}$, $T_{load}$) is a negative value, the NAN device may determine that the measured throughput is tied to medium congestion.

In some implementations, the NAN device may determine the number of active NAN slots to be included in the updated the NDL schedule based on the values of $\overline{T_{busy}}$, $\overline{T_{load}}$, Var($T_{load}$), and cov($T_{busy}$ $T_{load}$). For example, if cov ($T_{busy}$ $T_{load}$) is a positive value but $\overline{T_{idle}}$ is less than or equal to a threshold duration, the NAN device may maintain the current NDL schedule (no change to the number of active NAN slots). If cov($T_{busy}$, $T_{load}$) is a positive value and $\overline{T_{idle}}$ is greater than the threshold duration, the NAN device may reduce the number of active NAN slots for subsequent DW intervals. In some aspects, the reduced number (R) of active slots can be calculated as a function of $\overline{T_{load}}$ and $T_{slot}$:

$$R = \left\lceil \frac{\overline{T_{load}} * 32}{T_{slot}} \right\rceil + \Delta_s$$

where $\Delta_s$ represents a number of "overflow" slots. For example, the overflow slots may provide a buffer to support variations in data throughput per DW interval. Thus, in some implementations, $\Delta_s$ may be determined based on Var($T_{load}$). If cov($T_{busy}$, $T_{load}$) is a negative value (indicating that the throughput is being limited by congestion on the wireless medium), the NAN device may increase the number of active NAN slots. In some aspects, the NAN device may increase the number of active NAN slots by 2*Δs slots.

In some other implementations, the NAN device may calculate a joint estimation metric (C2), at the end of each DW interval, based on the values of $\overline{T_{busy}}$ and $\overline{T_{load}}$ associated with the DW interval:

$$C2 = \frac{\alpha \overline{T_{busy}} + \beta \overline{T_{load}}}{T_{slot}}$$

where α and β are scalar quantities that can be configured to weight the contributions of $\overline{T_{busy}}$ and $\overline{T_{load}}$, respectively, to the joint estimation metric C2. As described above, the joint estimation metric C2 may indicate a percentage of time that the NAN slots are occupied during a DW interval. Thus, lower values of C2 may indicate greater opportunities for power saving. In some implementations, the NAN device may determine the number of active NAN slots to be included in the updated the NDL schedule based on the value of C2. For example, lower values of C2 may be associated with lower numbers of active NAN slots and higher values of C2 may be associated with greater numbers of active NAN slots. In some aspects, the values of C2 may be averaged (linearly or non-linearly) over a number (N) of DW intervals to produce a composite estimation metric $\overline{C2}$. Accordingly, the value of $\overline{C2}$ may represent a running average of C2 values acquired over multiple DW intervals. In some implementations, the NAN device may compare the value of C2 (or $\overline{C2}$) to a lookup table (LUT) that stores a range of values for C2 (or $\overline{C2}$) and an associated number of active NAN slots for each C2 (or $\overline{C2}$) value.

Figure 7:
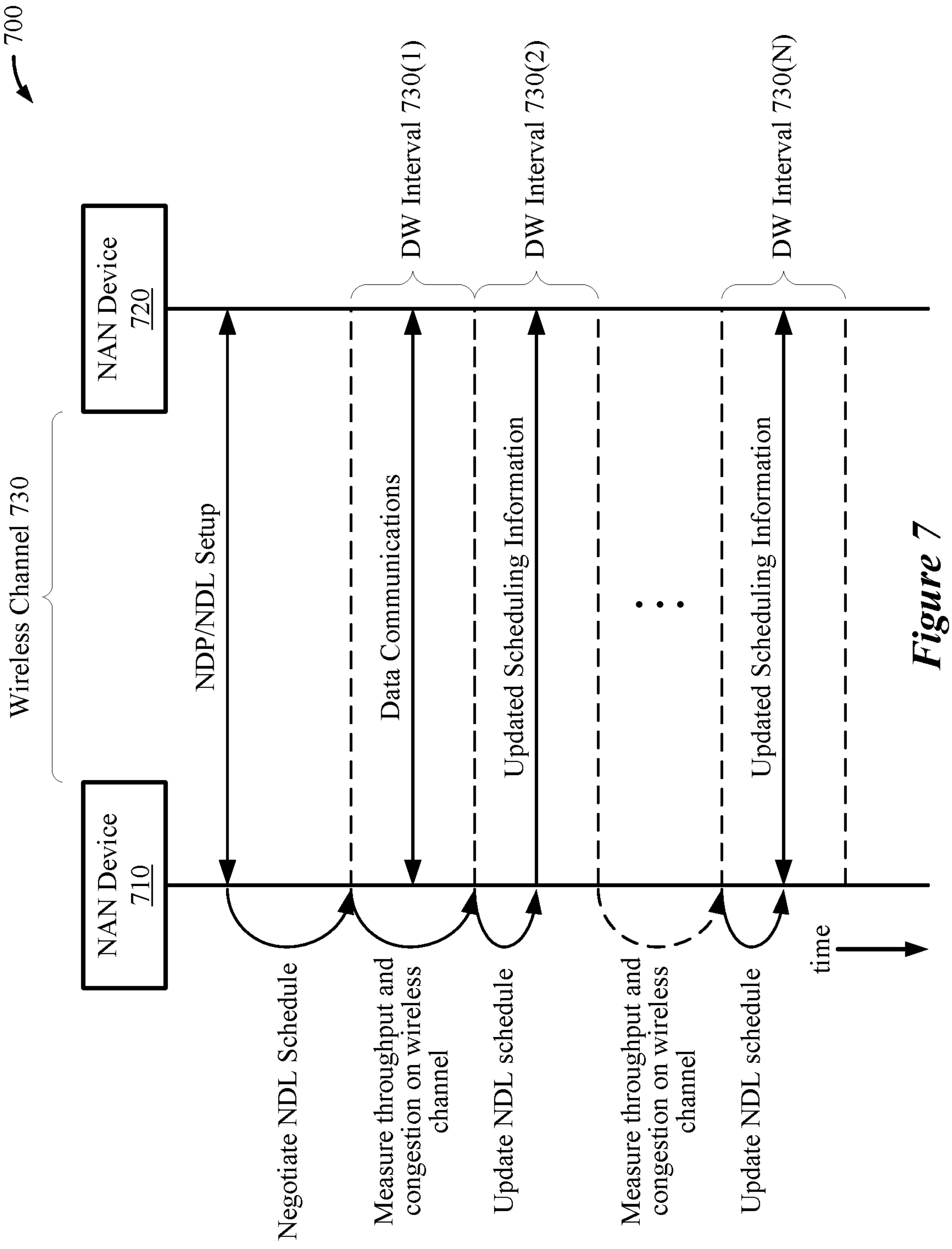
FIG. 7 shows a sequence diagram depicting an example message exchange between NAN devices according to some implementations.

FIG. 7 shows a sequence diagram 700 depicting an example message exchange between NAN devices 710 and 720 according to some implementations. Each of the NAN devices 710 and 720 may be an example one of the STAs 104 or 404 of FIGS. 1 and 4, respectively, or any one of the NAN devices 504 of FIG. 5. In some implementations, the NAN device 710 and 720 may belong to the same NAN cluster and may be synchronized to the same DWs.

The first NAN device 710 may set up an NDP with the second NAN device 720. For example, the first NAN device 710, acting as an NDP initiator, may select a first NDI for the NDP and transmit a data path request NAN action frame (NAF) to the second NAN device 720 indicating a request to set up an NDP. If an NDL has not yet been established between the NAN devices 710 and 720, the data path request NAF also may include scheduling information indicating a proposed NDL schedule. The second NAN device 720, acting as an NDP responder, may accept the NDP setup request from the first NAN device 710 and select a second NDI for the NDP. The second NAN device 720 may transmit a data path response NAF back to the first NAN device 710 indicating acceptance of the NDP. If an NDL has not yet been established between the NAN devices 710 and 720, the data path response NAF also may include scheduling information indicating acceptance of the proposed NDL schedule or a counter proposal. After negotiating an NDL schedule, the NAN devices 710 and 720 may successfully establish an NDL over a wireless channel 730.

In the example of FIG. 7, the NDP persists for at least a number (N) of DW intervals 730(1)-730(N). For the first DW interval 730(1), the NAN devices 710 and 720 may transmit and receive data communications over the NDL during the NAN slots identified by the negotiated NDL schedule. Specifically, the first and second NDIs of the respective NAN devices 710 and 720 must remain active for the duration of the NAN slots identified by the NDL schedule. In some implementations, the first NAN device 710 may measure throughput and congestion on the wireless channel 730 during each NAN slot of the first DW interval 730(1). With reference for example to FIG. 6, the first NAN device 710 may determine a respective set of values $T_{busy}$ and $T_{load}$ for each of the NAN slots within the first DW interval 730(1). In the example of FIG. 7, the measurements are shown to be performed by the first NAN device 710. However, in actual implementations, the throughput and congestion may be measured by the first NAN device 710, the second NAN device 720, or a combination thereof.

At the end of the first DW interval 730(1), the first NAN device 710 may calculate values of $\overline{T_{busy}}$ and $\overline{T_{load}}$ based on the values of $T_{busy}$ and $T_{load}$, respectively, acquired over the duration of the DW interval. In some implementations, the first NAN device 710 may calculate values of Var ($T_{load}$) and cov($T_{busy}$, $T_{load}$) and dynamically update the NDL schedule based on the values of $\overline{T_{busy}}$, $\overline{T_{load}}$, Var($T_{load}$), and cov($T_{busy}$, $T_{load}$). For example, as described above with reference to FIG. 6, the first NAN device 710 may determine whether to increase, decrease, or maintain the number of active NAN slots based on whether cov($T_{busy}$, $T_{load}$) is positive or negative, and whether $\overline{T_{idle}}$ is greater than a threshold duration. In some other implementations, the first NAN device 710 may calculate a joint estimation metric C2 (such as described with reference to FIG. 6) and dynamically update the NDL schedule based on the value of C2. For example, as further described with reference to FIG. 6, the first NAN device 710 may compare the value of C2 to an LUT to determine the number of active NAN slots. If the first NAN device 710 decides to increase or decrease the number of active NAN slots (such as shown in FIG. 7), the NAN device 710 may transmit updated scheduling information to the second NAN device 720 to identify the NAN slots to be added or removed from the NDL schedule. The updated scheduling information can be transmitted in a NAN beacon frame, a schedule update notification NAF, or any other unicast or broadcast NAN management frame.

The first NAN device 710 may proceed to implement the updated NDL schedule during the second DW interval 730(2). Upon receiving the updated scheduling information from the first NAN device, the second NAN device 720 also may implement the updated NDL schedule during the second DW interval 730(2). In some aspects, each of the first and second NAN devices 710 and 720 may implement the updated NDL schedule beginning with the next NAN slot immediately following the transmission or reception of the updated scheduling information. In some implementations, the process described above may be repeated over a number (N) of DW intervals. For example, the first NAN device 710 may continue measuring the throughput and congestion on the wireless channel 730, and dynamically updating the NDL schedule, during each of the remaining DW intervals 730(2)-730(N). In this manner, the NAN devices 710 and 720 may dynamically adapt the number of active NAN slots, per DW interval, to the throughput of data communications over the NDL, thereby reducing the idle durations of their respective NDIs. By reducing the idle durations of the NDIs, aspects of the present disclosure may reduce or optimize the power consumption of the NAN devices 710 and 720.

Figure 8:
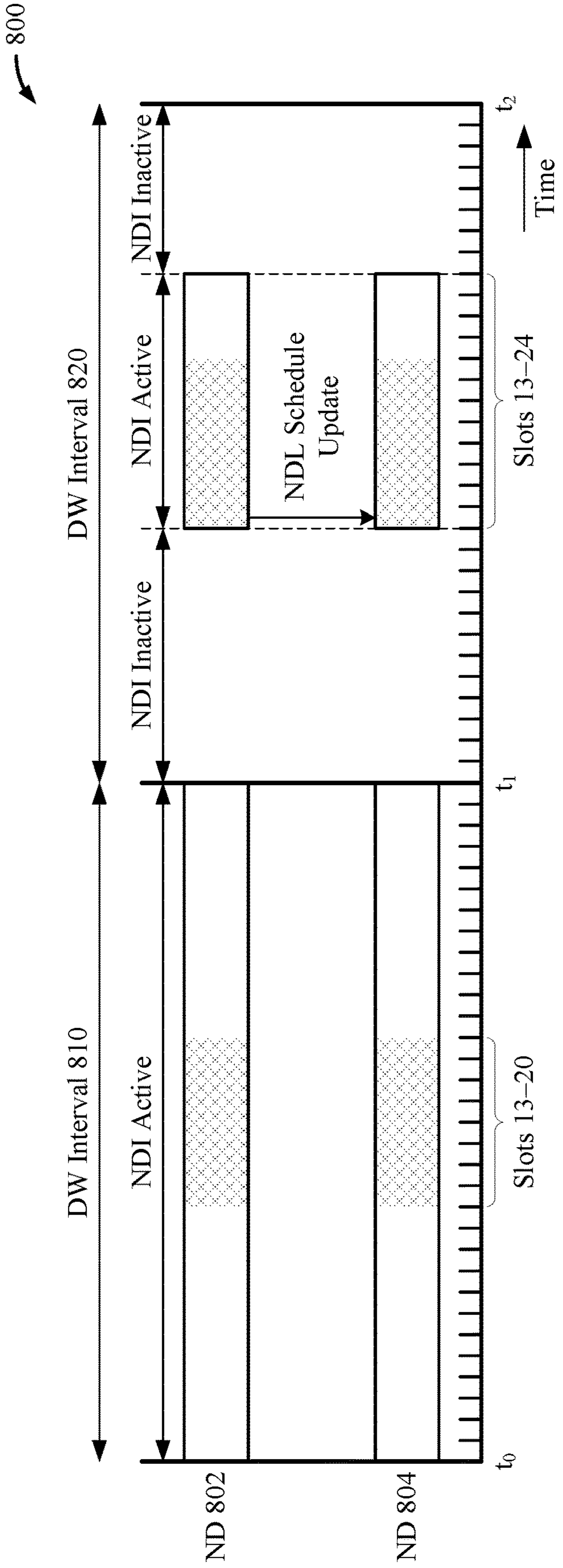
FIG. 8 shows a timing diagram depicting an example operation for dynamically adjusting an NDL schedule according to some implementations.

FIG. 8 shows a timing diagram 800 depicting an example operation for dynamically adjusting an NDL schedule according to some implementations. The NDL schedule is shared by a pair of NAN devices (ND) 802 and 804. More specifically, the NDL schedule indicates a set of NAN slots, with a DW interval, during which an NDL can be used for data communications between the NAN devices 802 and 804. In the example of FIG. 8, the NDL schedule is implemented for at least two DW intervals 810 and 820. The first DW interval 810 spans a duration from times $t_0$ to $t_1$ and the second DW interval 820 spans a duration from times $t_1$ to $t_2$.

During the first DW interval 810, the NDL schedule is shown to span all 32 NAN slots. Thus, each of the NAN devices 802 and 804 must be available to transmit or receive data communications (over the NDL) for the duration of the first DW interval 810. Specifically, the NDIs used to transmit and receive the data communications between the NAN devices 802 and 804 must remain active during each of the 32 NAN slots. In some implementations, the first NAN device 802 may measure throughput and congestion on the wireless medium during each NAN slot of the first DW interval 810. With reference for example to FIG. 6, the first NAN device 802 may determine a respective set of values $T_{busy}$ and $T_{load}$ for each of the NAN slots within the first DW interval 810. At the end of the first DW interval 810, the first NAN device 802 may calculate values of $\overline{T_{busy}}$and $\overline{T_{load}}$based on the values of $T_{busy}$ and $T_{load}$ acquired from times $t_0$ to $t_1$. In some implementations, the first NAN device 802 may further calculate $Var(T_{load})$ and $cov(T_{busy}, T_{load})$ based on the values of $T_{busy}$ and $T_{load}$. In some other implementations, the first NAN device 802 may calculate a joint estimation metric C2 (such as described with reference to FIG. 6). In some implementations, the first NAN device 802 may dynamically update the NDL schedule based on the values of $\overline{T_{busy}}$, $\overline{T_{load}}$, $Var(\overline{T_{load}})$, $cov(T_{busy}, T_{load})$, or C2.

In the example of FIG. 8, the first NAN device 802 may decide, at time $t_1$, to reduce the number of active NAN slots. Specifically, the NAN device 802 may determine that data is transmitted and received over the NDL for only ¼ of the overall duration of the first DW interval 810 ($\overline{T_{load}}$=4 TUs). For example, as shown in FIG. 8, the data communications may span a duration of NAN slots 13-20 of the first DW interval 810. As a result, the NAN device 802 may reduce the number of active NAN slots from 32 to 12 slots (R=8+4, where Δs=4). In some aspects, the 12 active NAN slots may substantially coincide with NAN slots during which data communications between the NAN devices 802 and 804 have occurred or are expected to occur (such as NAN slots 13-24). The first NAN device 802 may transmit an NDL schedule update message, during the second DW interval 820, to indicate the updated NDL schedule to the second NAN device 804. The NDL schedule update message may be a NAN beacon frame, a schedule update notification NAF, or any other unicast or broadcast NAN management frame that can convey the updated availability schedule of the first NAN device 802. In the example of FIG. 8, the NDL schedule update message is transmitted during the first active NAN slot of the second DW interval 820 (slot 13). However, in actual implementations, the NDL schedule update message may be transmitted during any of the available NAN slots.

As a result of the update, the NDL schedule is shown to span only NAN slots 13-24 of the second DW window 820. In the example of FIG. 8, active NAN slots 21-24 may represent overflow NAN slots (Δs=4). However, in actual implementations, any number of overflow NAN slots may be distributed before or after the active NAN slots during which data communications between the NAN device 802 and 804 are expected to occur (such as NAN slots 13-20). Thus, each of the NAN devices 802 and 804 must be available to transmit or receive data communications (over the NDL) for a duration of the active NAN slots 13-24. More specifically, the NDIs used to transmit and receive the data communications between the NAN devices 802 and 804 may be in an inactive or power-saving state for the first 12 NAN slots of the second DW interval 820 and the last 8 NAN slots of the DW interval 820. In some implementations, the first NAN device 802 may continue measuring throughput and congestion on the wireless medium during each NAN slot of the second DW interval 820. For example, the first NAN device 802 may determine a respective set of values $T_{busy}$ and $T_{load}$ for each of the NAN slots within the second DW interval 820. At the end of the second DW interval 820, the first NAN device 802 may calculate values of $\overline{T_{busy}}$, $\overline{T_{load}}$, $Var(T_{load})$, $cov(T_{busy}, T_{load})$, or C2 based on the values of $T_{busy}$ and $T_{load}$ acquired from times $t_0$ to $t_1$. In some implementations, the first NAN device 802 may further update the NDL schedule based on the values of $\overline{T_{busy}}$, $\overline{T_{load}}$, $Var(T_{load})$, $cov(T_{busy}, T_{load})$, or C2.

Aspects of the present disclosure recognize that data communications between the NAN devices 802 and 804 may not be isolated to any single portion of a DW interval (such as shown in FIG. 8). Rather, in some instances, a NAN device may transmit data at a low but constant data rate (such as in periodic bursts) throughout the duration of a DW interval. In some implementations, a NAN device may distribute the active NAN slots periodically over the duration of a DW interval, for example, to accommodate low but constant rate data communications. In some aspects, the NAN device may determine a periodicity of the active NAN slots based on a standard deviation of $T_{load}$ (Gload). For example, if $T_{load}$ is greater than $\sigma_{load}$, the NAN device may group the active NAN slots together (such as shown in FIG. 8). However, if $T_{load}$ is less than or equal to $\sigma_{load}$, the NAN device may subdivide the DW interval into a number (n) of subintervals. For example, if n=4, each subinterval may span a duration of 8 NAN slots. The number (D) of active NAN slots to be included in each subinterval can be determined as a function of the number of subintervals (n) and the total number (R) of active NAN slots allocated for the DW interval:

$$D = \left\lceil \frac{R+3}{n} \right\rceil$$

Figure 9:
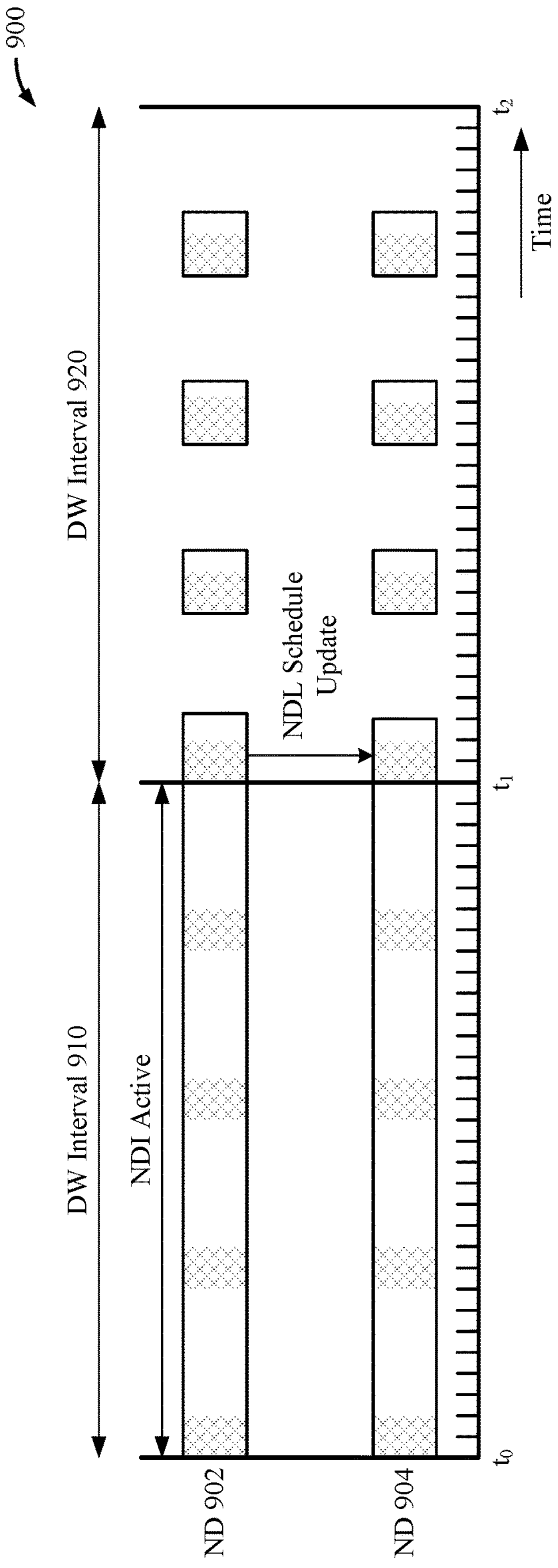
FIG. 9 shows a timing diagram depicting another example operation for dynamically adjusting an NDL schedule according to some implementations.

FIG. 9 shows a timing diagram 900 depicting another example operation for dynamically adjusting an NDL schedule according to some implementations. The NDL schedule is shared by a pair of NAN devices (ND) 902 and 904. More specifically, the NDL schedule indicates a set of NAN slots, with a DW interval, during which an NDL can be used for data communications between the NAN devices 902 and 904. In the example of FIG. 9, the NDL schedule is implemented for at least two DW intervals 910 and 920. The first DW interval 910 spans a duration from times $t_0$ to $t_1$ and the second DW interval 920 spans a duration from times $t_1$ to $t_2$.

During the first DW interval 910, the NDL schedule is shown to span all 32 NAN slots. Thus, each of the NAN devices 902 and 904 must be available to transmit or receive data communications (over the NDL) for the duration of the first DW interval 910. Specifically, the NDIs used to transmit and receive the data communications between the NAN devices 902 and 904 must remain active during each of the 32 NAN slots. In some implementations, the first NAN device 902 may measure throughput and congestion on the wireless medium during each NAN slot of the first DW interval 910. With reference for example to FIG. 6, the first NAN device 902 may determine a respective set of values $T_{busy}$ and $T_{load}$ for each of the NAN slots within the first DW interval 910. At the end of the first DW interval 910, the first NAN device 902 may calculate values of $\overline{T_{busy}}$ and $\overline{T_{load}}$ based on the values of $T_{busy}$ and $T_{load}$ acquired from times $t_0$ to $t_1$. In some implementations, the first NAN device 902 may further calculate Var($T_{load}$) and cov($T_{busy}$, $T_{load}$) based on the values of $T_{busy}$ and $T_{load}$. In some other implementations, the first NAN device 902 may calculate a joint estimation metric C2 (such as described with reference to FIG. 6). In some implementations, the first NAN device 902 may dynamically update the NDL schedule based on the values of $\overline{T_{busy}}$, $\overline{T_{load}}$, Var($T_{load}$), cov($T_{busy}$, $T_{load}$), or C2.

In the example of FIG. 9, the first NAN device 902 may decide, at time $t_1$, to reduce the number of active NAN slots. Specifically, the NAN device 902 may determine that data is transmitted and received over the NDL for only ¼ of the overall duration of the first DW interval 910 ($\overline{T_{load}}$=4 TUs). For example, as shown in FIG. 9, data may be transmitted in periodic bursts throughout the duration of the first DW interval 910 (coinciding with NAN slots 1, 2, 9, 10, 17, 18, 25, and 26), where each burst of data spans a duration of 2 NAN slots. As a result, the NAN device 902 may reduce the number of active NAN slots from 32 to 12 slots (R=8+4, where Δs=4). Because the data communications are spread throughout the duration of a DW interval, the NAN device 902 may distribute the active NAN slots in a periodic fashion across the duration of the second DW interval 920, for example, to coincide with NAN slots during which data communications between the NAN device 902 and 904 have occurred or are expected to occur. For example, as shown in FIG. 9, the 12 active NAN slots may be subdivided into four contiguous groups (each containing 3 NAN slots) coinciding with NAN slots 1-3, 9-11, 17-19, and 25-27.

The first NAN device 902 may transmit an NDL schedule update message, during the second DW interval 920, to indicate the updated NDL schedule to the second NAN device 904. The NDL schedule update message may be a NAN beacon frame, a schedule update notification NAF, or any other unicast or broadcast NAN management frame that can convey the updated availability schedule of the first NAN device 902 and may be transmitted during any of the 32 NAN slots within the second DW interval 920. As a result of the update, each of the NDIs used to transmit and receive the data communications between the NAN devices 902 and 904 may be in an inactive or power-saving state during 20 of the NAN slots of the second DW interval 920. In some implementations, the first NAN device 902 may continue measuring throughput and congestion on the wireless medium during each NAN slot of the second DW interval 920. For example, at the end of the second DW interval 920, the first NAN device 902 may further update the NDL schedule based on updated values of $\overline{T_{busy}}$, $\overline{T_{load}}$, Var($T_{load}$), cov($T_{busy}$, $T_{load}$), or C2.

Aspects of the present disclosure further recognize that, while $T_{busy}$ and $T_{load}$ may provide a fairly accurate prediction of future data communications over the NDL, the actual throughput of data communications can change significantly between DW intervals. In some implementations, a NAN device may test the accuracy of its prediction by selectively probing one or more NAN slots for incoming data. For example, the NAN device may activate additional NAN slots (referred to herein as "probed NAN slots") during a given DW interval regardless of the values of $T_{busy}$ and $T_{load}$. If the NAN device receives incoming data during one or more of the probed NAN slots, the existing NDL schedule may not be optimized for data communications over the NDL. In some aspects, the NAN device may further update the NDL schedule based on the amount of data received during the probed NAN slots. For example, if the data received during the probed NAN slots exceeds a threshold amount, the NAN device may increase the number of active NAN slots in one or more subsequent DW intervals.

Figure 10:
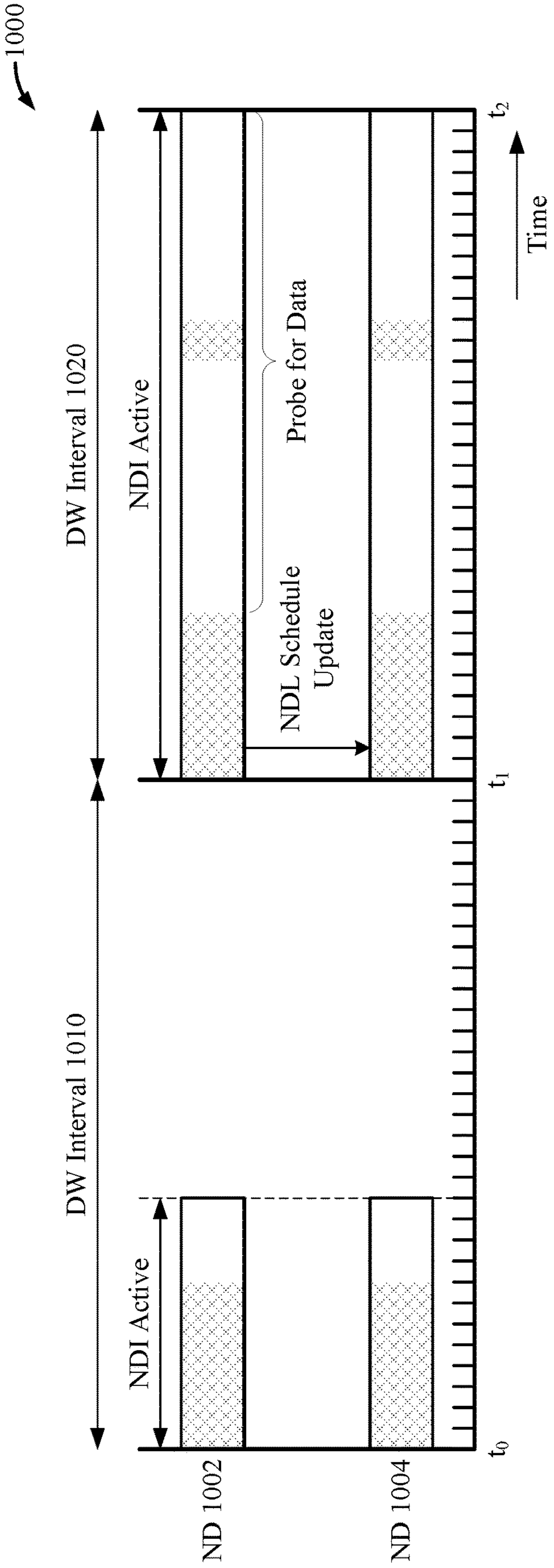
FIG. 10 shows a timing diagram depicting another example operation for dynamically adjusting an NDL schedule according to some implementations.

FIG. 10 shows a timing diagram 1000 depicting another example operation for dynamically adjusting an NDL schedule according to some implementations. The NDL schedule is shared by a pair of NAN devices (ND) 1002 and 1004. More specifically, the NDL schedule indicates a set of NAN slots, with a DW interval, during which an NDL can be used for data communications between the NAN devices 1002 and 1004. In the example of FIG. 10, the NDL schedule is implemented for at least two DW intervals 1010 and 1020. The first DW interval 1010 spans a duration from times $t_0$ to $t_1$ and the second DW interval 1020 spans a duration from times $t_1$ to $t_2$.

During the first DW interval 1010, the NDL schedule is shown to span only the first 12 NAN slots. Thus, the NDIs used to transmit and receive the data communications between the NAN devices 1002 and 1004 may be in an inactive or power-saving state for the last 20 NAN slots of the first DW interval 1010. Because the last 20 NAN slots are not available for data communications over the NDL, the first NAN device 1002 does not know whether the second NAN device 1004 has any data to transmit during any of these NAN slots. In some implementations, the first NAN device 1002 may probe the last 20 NAN slots of the second DW interval 1020 for incoming data from the second NAN device 1004. For example, the first NAN device 1002 may transmit an NDL schedule update message to the second NAN device 1004 indicating that the updated NDL schedule is to span all 32 NAN slots. The NDL schedule update message may be a NAN beacon frame, a schedule update notification NAF, or any other unicast or broadcast NAN management frame that can convey the updated availability schedule of the first NAN device 1002.

As a result of the update, each of the NDIs used to transmit and receive the data communications between the NAN devices 1002 and 1004 may remain active during all 32 NAN slots of the second DW interval 1020. As a result, the first NAN device 1002 may listen for incoming data from the second NAN device 1004 during the last 20 NAN slots of the second DW interval 1020. At the end of the second DW interval 1020 (at time $t_2$), the first NAN device 1002 may determine whether to further update the NDL schedule or revert to the existing NDL schedule. For example, if the first NAN device 1002 does not receive any incoming data during any of the last 20 NAN slots, the first NAN device 1002 may transmit another NDL schedule update message (not shown for simplicity) to the second NAN device 1004 indicating a request to revert to the existing NDL schedule. On the other hand, if the first NAN device 1002 receives incoming data during one or more of the last 20 NAN slots (such as shown in FIG. 10), the first NAN device 1002 may transmit another NDL schedule update message (not shown for simplicity) to the second NAN device 1004 indicating further updates to the NDL schedule. For example, the updated NDL schedule may include one or more additional active NAN slots that are not currently active in the existing NDL schedule.

Figure 11:
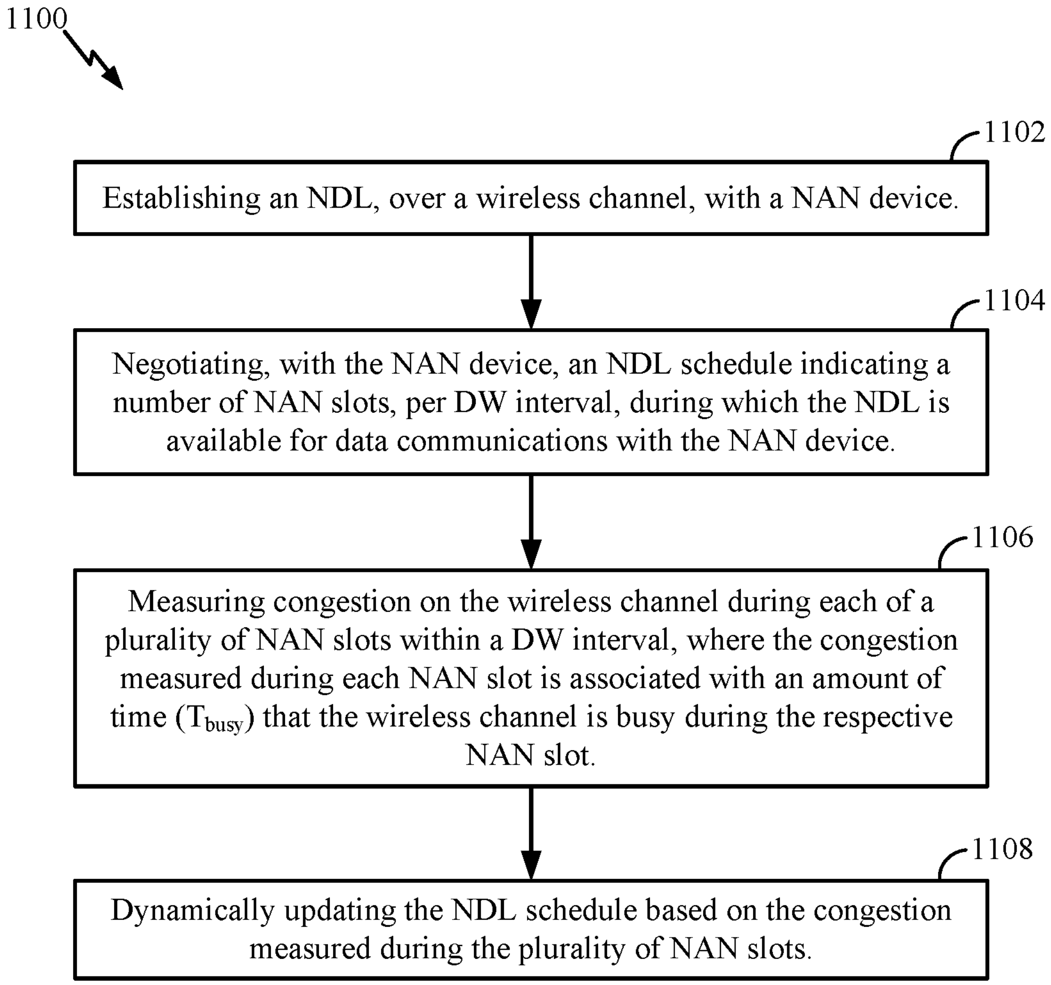
FIG. 11 shows a flowchart illustrating an example process for wireless communication that supports adaptive NAN data interfaces (NDIs) according to some implementations.

FIG. 11 shows a flowchart illustrating an example process 1100 for wireless communication that supports adaptive NDIs according to some implementations. In some implementations, the process 1100 may be performed by a wireless communication device operating as or within a network node, such as one of the STAs 404 or 504 described above with reference to FIGS. 4B and 5, respectively.

In some implementations, the process 1100 begins in block 1102 with establishing an NDL, over a wireless channel, with a NAN device. In block 1104, the process 1100 proceeds with negotiating, with the NAN device, an NDL schedule indicating a number of NAN slots, per DW interval, during which the NDL is available for data communications with the NAN device. In block 1106, the process 1100 proceeds with measuring congestion on the wireless channel during each of a plurality of NAN slots within a DW interval, where the congestion measured during each NAN slot is associated with an amount of time ($T_{busy}$) that the wireless channel is busy during the respective NAN slot. In some implementations, the congestion may be measured based on a CCA mechanism. In block 1108, the process 1100 proceeds with dynamically updating the NDL schedule based on the congestion measured during the plurality of NAN slots. In some implementations, the dynamic updating of the NDL schedule may include transmitting, to the NAN device, a NAN management frame carrying information indicating the updated NDL schedule.

In some implementations, throughput also may be measured on the NDL during each of the plurality of NAN slots, where the throughput measured during each NAN slot is associated with an amount of time ($T_{load}$) that the wireless communication device communicates with the NAN device, over the NDL, during the respective NAN slot. In some implementations, the dynamic updating of the NDL schedule may include adjusting the number of NAN slots, per DW interval, during which the NDL is available for data communications with the NAN device based on a covariance of $T_{busy}$ and $T_{load}$.

In some implementations, the adjusting of the number of NAN slots may include increasing the number of NAN slots based on the covariance of $T_{busy}$ and $T_{load}$ being a negative value. In some other implementations, the adjusting of the number of NAN slots may include reducing the number of NAN slots based on the covariance of $T_{busy}$ and $T_{load}$ being a positive value and an average idle duration of the NDL being greater than a threshold value. In some implementations, the congestion and throughput measured during each of the plurality of NAN slots may indicate an amount of time ($T_{idle}$) that the wireless channel is idle during the respective NAN slot, where the average idle duration of the NDL is equal to a mean of $T_{idle}$.

In some other implementations, the dynamic updating of the NDL schedule may include obtaining the number of NAN slots, per DW interval, during which the NDL is available for data communications with the NAN device based on a joint estimation metric associated with $T_{busy}$ and $T_{load}$. In some implementations, the number of NAN slots may be obtained from an LUT that stores a plurality of values associated with the joint estimation metric and information indicating a respective number of NAN slots associated with each of the plurality of values.

In some implementations, the dynamic updating of the NDL schedule may include adjusting a periodicity of the NAN slots, per DW interval, during which the NDL is available for data communications with the NAN device based on a standard deviation of $T_{load}$. In some aspects, the adjusting of the periodicity of the NAN slots may include increasing the periodicity of the NAN slots based on $T_{load}$ being less than or equal to the standard deviation of $T_{load}$. In some other aspects, the adjusting of the periodicity of the NAN slots may include reducing the periodicity of the NAN slots based on $T_{load}$ being greater than the standard deviation of $T_{load}$.

In some implementations, the wireless communication device may further listen for incoming data from the NAN device during one or more NAN slots not indicated by the NDL schedule. In some aspects, the dynamic updating of the NDL schedule may include adjusting the number of NAN slots, per DW interval, during which the NDL is available for data communications with the NAN device based on detecting incoming data from the NAN device during the one or more NAN slots not indicated by the NDL schedule.

Figure 12:
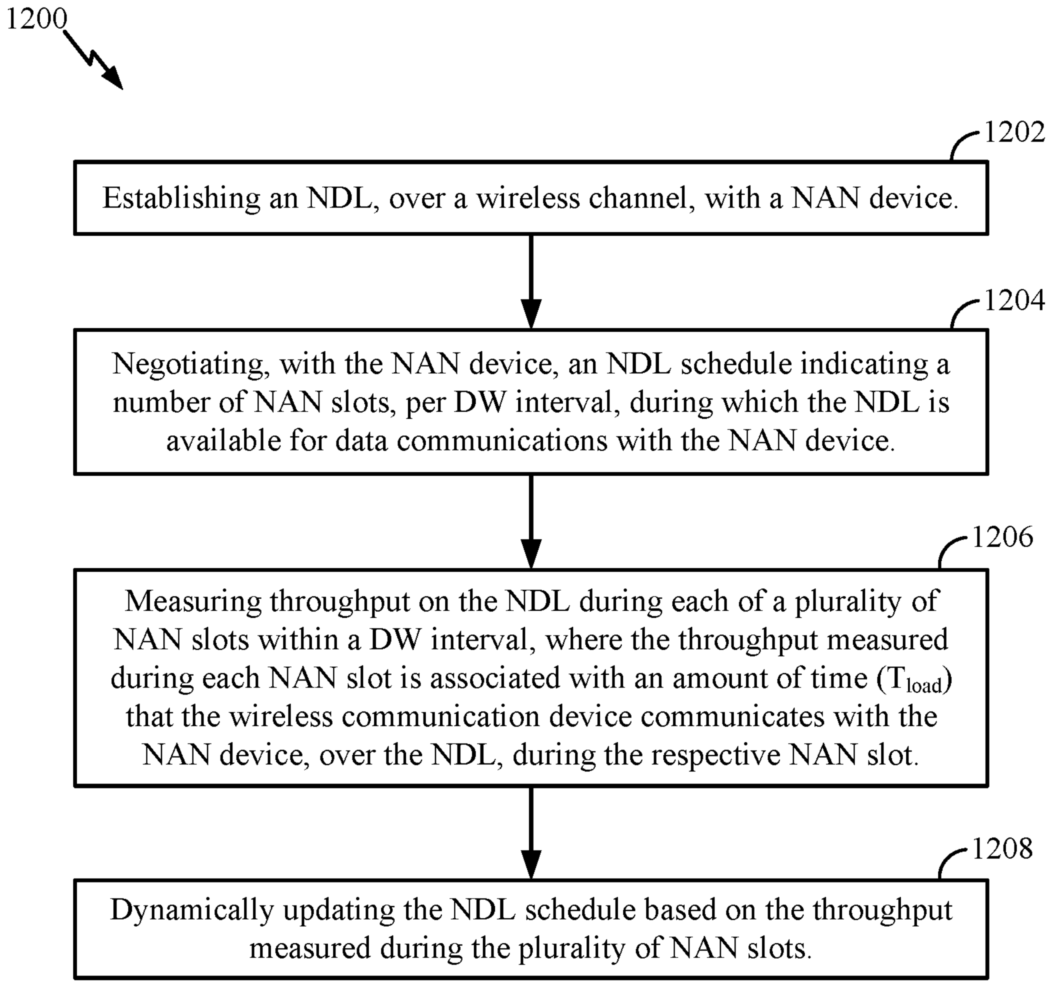
FIG. 12 shows a flowchart illustrating an example process for wireless communication that supports adaptive NDIs according to some implementations.

FIG. 12 shows a flowchart illustrating an example process 1200 for wireless communication that supports adaptive NDIs according to some implementations. In some implementations, the process 1200 may be performed by a wireless communication device operating as or within a network node, such as one of the STAs 404 or 504 described above with reference to FIGS. 4B and 5, respectively.

In some implementations, the process 1200 begins in block 1202 with establishing an NDL, over a wireless channel, with a NAN device. In block 1204, the process 1200 proceeds with negotiating, with the NAN device, an NDL schedule indicating a number of NAN slots, per DW interval, during which the NDL is available for data communications with the NAN device. In block 1206, the process 1200 proceeds with measuring throughput on the NDL during each of a plurality of NAN slots within a DW interval, where the throughput measured during each NAN slot is associated with an amount of time ($T_{load}$) that the wireless communication device communicates with the NAN device, over the NDL, during the respective NAN slot. In some implementations, the throughput may be measured based on an amount of data transmitted and received over the NDL. In block 1208, the process 1200 proceeds with dynamically updating the NDL schedule based on the congestion measured during the plurality of NAN slots. In some implementations, the dynamic updating of the NDL schedule may include transmitting, to the NAN device, a NAN management frame carrying information indicating the updated NDL schedule.

In some implementations, congestion also may be measured on a wireless channel associated with the NDL during each of the plurality of NAN slots, where the congestion measured during each NAN slot is associated with an amount of time ($T_{busy}$) that the wireless channel is busy during the respective NAN slot. In some implementations, the updating of the NDL schedule may include adjusting the number of NAN slots, per DW interval, during which the NDL is available for data communications with the NAN device based on a covariance of $T_{busy}$ and $T_{load}$.

In some implementations, the adjusting of the number of NAN slots may include increasing the number of NAN slots based on the covariance of $T_{busy}$ and $T_{load}$ being a negative value. In some other implementations, the adjusting of the number of NAN slots may include reducing the number of NAN slots based on the covariance of $T_{busy}$ and $T_{load}$ being a positive value and an average idle duration of the NDL being greater than a threshold value. In some implementations, the congestion and throughput measured during each of the plurality of NAN slots may indicate an amount of time ($T_{idle}$) that the wireless channel is idle during the respective NAN slot, where the average idle duration of the NDL is equal to a mean of $T_{idle}$.

In some other implementations, the dynamic updating of the NDL schedule may include obtaining the number of NAN slots, per DW interval, during which the NDL is available for data communications with the NAN device based on a joint estimation metric associated with $T_{busy}$ and $T_{load}$. In some implementations, the number of NAN slots may be obtained from an LUT that stores a plurality of values associated with the joint estimation metric and information indicating a respective number of NAN slots associated with each of the plurality of values.

In some implementations, the dynamic updating of the NDL schedule may include adjusting a periodicity of the NAN slots, per DW interval, during which the NDL is available for data communications with the NAN device based on a standard deviation of $T_{load}$. In some aspects, the adjusting of the periodicity of the NAN slots may include increasing the periodicity of the NAN slots based on $T_{load}$ being less than or equal to the standard deviation of $T_{load}$. In some other aspects, the adjusting of the periodicity of the NAN slots may include reducing the periodicity of the NAN slots based on $T_{load}$ being greater than the standard deviation of $T_{load}$.

In some implementations, the wireless communication device may listen for incoming data from the NAN device during one or more NAN slots not indicated by the NDL schedule. In some aspects, the dynamic updating of the NDL schedule may include adjusting the number of NAN slots, per DW interval, during which the NDL is available for data communications with the NAN device based on detecting incoming data from the NAN device during the one or more NAN slots not indicated by the NDL schedule.

Figure 13:
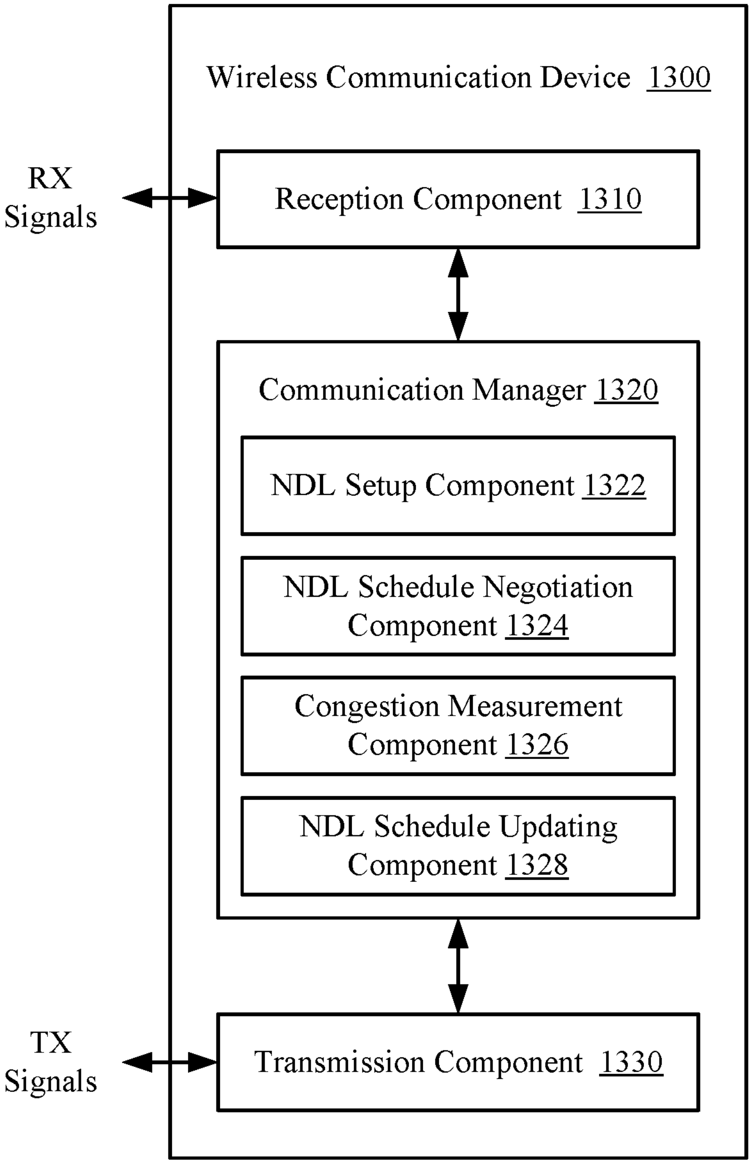
FIG. 13 shows a block diagram of an example wireless communication device according to some implementations.

FIG. 13 shows a block diagram of an example wireless communication device 1300 according to some implementations. In some implementations, the wireless communication device 1300 is configured to perform the process 1100 described above with reference to FIG. 11. The wireless communication device 1300 can be an example implementation of the wireless communication device 300 described above with reference to FIG. 3. For example, the wireless communication device 1300 can be a chip, SoC, chipset, package or device that includes at least one processor and at least one modem (for example, a Wi-Fi (IEEE 802.11) modem or a cellular modem).

The wireless communication device 1300 includes a reception component 1310, a communication manager 1320, and a transmission component 1330. The communication manager 1320 further includes an NDP setup component 1322, an NDL schedule negotiation component 1324, a congestion measurement component 1326, and an NDL schedule updating component 1328. Portions of one or more of the components 1322-1328 may be implemented at least in part in hardware or firmware. In some implementations, at least some of the components 1322-1328 are implemented at least in part as software stored in a memory (such as the memory 308). For example, portions of one or more of the components 1322-1328 can be implemented as non-transitory instructions (or "code") executable by a processor (such as the processor 306) to perform the functions or operations of the respective component.

The reception component 1310 is configured to receive RX signals from a NAN device. The transmission component 1330 is configured to transmit TX signals to the NAN device. The communication manager 1320 is configured to control or manage communications with the NAN device. In some implementations, the NDL setup component 1322 may establish a neighbor awareness networking (NAN) device link (NDL), over a wireless channel, with the NAN device; the NDL schedule negotiation component 1324 may negotiate, with the NAN device, an NDL schedule indicating a number of NAN slots, per DW interval, during which the NDL is available for data communications with the NAN device; the congestion measurement component 1326 may measure congestion on the wireless channel during each of a plurality of NAN slots within a DW interval, the congestion measured during each NAN slot being associated with an amount of time ($T_{busy}$) that the wireless channel is busy during the respective NAN slot; and the NDL schedule updating component 1328 may dynamically update the NDL schedule based on the congestion measured during the plurality of NAN slots.

Figure 14:
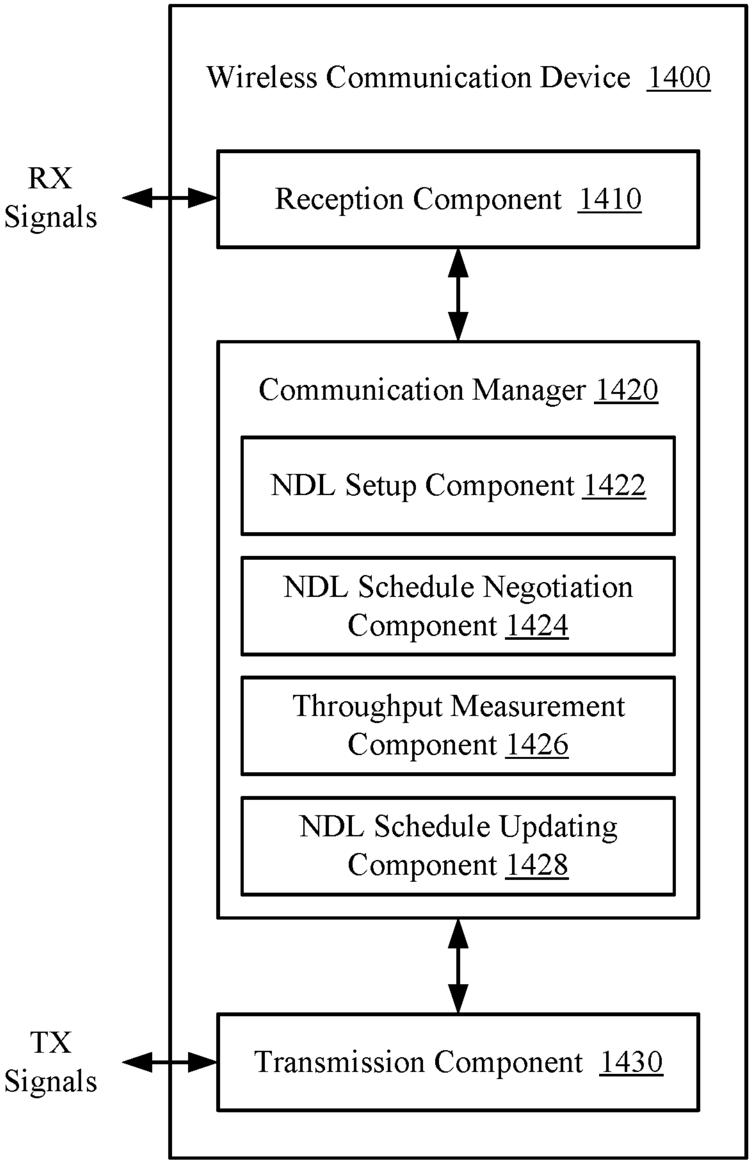
FIG. 14 shows a block diagram of an example wireless communication device according to some implementations.

FIG. 14 shows a block diagram of an example wireless communication device 1400 according to some implementations. In some implementations, the wireless communication device 1400 is configured to perform the process 1200 described above with reference to FIG. 12. The wireless communication device 1400 can be an example implementation of the wireless communication device 300 described above with reference to FIG. 3. For example, the wireless communication device 1400 can be a chip, SoC, chipset, package or device that includes at least one processor and at least one modem (for example, a Wi-Fi (IEEE 802.11) modem or a cellular modem).

The wireless communication device 1400 includes a reception component 1410, a communication manager 1420, and a transmission component 1430. The communication manager 1420 further includes an NDP setup component 1422, an NDL schedule negotiation component 1424, a throughput measurement component 1426, and an NDL schedule updating component 1428. Portions of one or more of the components 1422-1428 may be implemented at least in part in hardware or firmware. In some implementations, at least some of the components 1422-1428 are implemented at least in part as software stored in a memory (such as the memory 308). For example, portions of one or more of the components 1422-1428 can be implemented as non-transitory instructions (or "code") executable by a processor (such as the processor 306) to perform the functions or operations of the respective component.

The reception component 1410 is configured to receive RX signals from a NAN device. The transmission component 1430 is configured to transmit TX signals to the NAN device. The communication manager 1420 is configured to control or manage communications with the NAN device. In some implementations, the NDL setup component 1422 may establish a neighbor awareness networking (NAN) device link (NDL), over a wireless channel, with the NAN device; the NDL schedule negotiation component 1424 may negotiate, with the NAN device, an NDL schedule indicating a number of NAN slots, per DW interval, during which the NDL is available for data communications with the NAN device; the throughput measurement component 1426 may measure throughput on the NDL during each of a plurality of NAN slots within a DW interval, where the throughput measured during each NAN slot is associated with an amount of time ($T_{load}$) that the wireless communication device communicates with the NAN device, over the NDL, during the respective NAN slot; and the NDL schedule updating component 1428 may dynamically update the NDL schedule based on the throughput measured during the plurality of NAN slots.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Implementation examples are described in the following numbered clauses:

1. A method for wireless communication by a wireless communication device, including:
   - establishing a neighbor awareness networking (NAN) device link (NDL), over a wireless channel, with a NAN device;
   - negotiating, with the NAN device, an NDL schedule indicating a number of NAN slots, per discovery window (DW) interval, during which the NDL is available for data communications with the NAN device;
   - measuring congestion on the wireless channel during each of a plurality of NAN slots within a DW interval, the congestion measured during each NAN slot being associated with an amount of time ($T_{busy}$) that the wireless channel is busy during the respective NAN slot; and
   - dynamically updating the NDL schedule based on the congestion measured during the plurality of NAN slots.

2. The method of clause 1, further including:
   - measuring throughput on the NDL during each of the plurality of NAN slots, the throughput measured during each NAN slot being associated with an amount of time ($T_{load}$) that the wireless communication device communicates with the NAN device, over the NDL, during the respective NAN slot, the dynamic updating of the NDL schedule being further based on the throughput measured during the plurality of NAN slots.

3. The method of any of clauses 1 or 2, where the dynamic updating of the NDL schedule includes:
   - adjusting the number of NAN slots, per DW interval, during which the NDL available for data communications with the NAN device based on a covariance of $T_{busy}$ and $T_{load}$.

4. The method of any of clauses 1-3, where the adjusting of the number of NAN slots includes:
   - increasing the number of NAN slots based on the covariance of $T_{busy}$ and $T_{load}$ being a negative value.

5. The method of any of clauses 1-4, where the adjusting of the number of NAN slots includes:
   - reducing the number of NAN slots based on the covariance of $T_{busy}$ and $T_{load}$ being a positive value and an average idle duration of the NDL being greater than a threshold value.

6. The method of any of clauses 1-5, where the congestion and throughput measured during each of the plurality of NAN slots indicates an amount of time ($T_{idle}$) that the wireless channel is idle during the respective NAN slot, the average idle duration of the NDL being equal to a mean of $T_{idle}$.

7. The method of any of clauses 1-6, where the dynamic updating of the NDL schedule includes:
   - adjusting a periodicity of the NAN slots, per DW interval, during which the NDL is available for data communications with the NAN device based on a standard deviation of $T_{load}$.

8. The method of any of clauses 1-7, where the adjusting of the periodicity of the NAN slots includes:
   - increasing the periodicity of the NAN slots based on Load being less than or equal to the standard deviation of $T_{load}$.

9. The method of any of clauses 1-8, where the adjusting of the periodicity of the NAN slots includes:
   - reducing the periodicity of the NAN slots based on $T_{load}$ being greater than the standard deviation of $T_{load}$.

10. The method of any of clauses 1-9, where the dynamic updating of the NDL schedule includes:
    - obtaining the number of NAN slots, per DW interval, during which the NDL is available for data communications with the NAN device based on a joint estimation metric associated with $T_{busy}$ and $T_{load}$.

11. The method of any of clauses 1-10, where number of NAN slots is obtained from a look-up table (LUT) that stores a plurality of values associated with the joint estimation metric and information indicating a respective number of NAN slots associated with each of the plurality of values.

12. The method of any of clauses 1-11, further including:
    - listening for incoming data from the NAN device during one or more NAN slots not indicated by the NDL schedule.

13. The method of any of clauses 1-12, where the dynamic updating of the NDL schedule includes:
    - adjusting the number of NAN slots, per DW interval, during which the NDL is available for data communications with the NAN device based on detecting incoming data from the NAN device during the one or more NAN slots not indicated by the NDL schedule.

14. A wireless communication device including:
    - at least one modem;
    - at least one processor communicatively coupled with the at least one modem; and
    - at least one memory communicatively coupled with the at least one processor and storing processor-readable code that, when executed by the at least one processor in conjunction with the at least one modem, is configured to perform the method of any one or more of clauses 1-13.

15. A method for wireless communication by a wireless communication device, including:

establishing a neighbor awareness networking (NAN) device link (NDL) with a NAN device;

negotiating, with the NAN device, an NDL schedule indicating a number of NAN slots, per discovery window (DW) interval, during which the NDL is available for data communications with the NAN device;

measuring throughput on the NDL during each of a plurality of NAN slots within a DW interval, the throughput measured during each NAN slot being associated with an amount of time ($T_{load}$) that the wireless communication device communicates with the NAN device, over the NDL, during the respective NAN slot; and dynamically updating the NDL schedule based on the throughput measured during the plurality of NAN slots.

16. The method of clause 15, further including:

Measuring congestion on a wireless channel associated with the NDL during each of the plurality of NAN slots, the congestion measured during each NAN slot being associated with an amount of time ($T_{busy}$) that the wireless channel is busy during the respective NAN slot, the dynamic updating of the NDL schedule being further based on the throughput measured during the plurality of NAN slots.

17. The method of any of clauses 15 or 16, where the dynamic updating of the NDL schedule includes:

adjusting the number of NAN slots, per DW interval, during which the NDL is available for data communications with the NAN device based on a covariance of $T_{busy}$ and $T_{load}$.

18. The method of any of clauses 15-17, where the adjusting of the number of NAN slots includes:

increasing the number of NAN slots based on the covariance of $T_{busy}$ and $T_{load}$ being a negative value.

19. The method of any of clauses 15-18, where the adjusting of the number of NAN slots includes:

reducing the number of NAN slots based on the covariance of $T_{busy}$ and $T_{load}$ being a positive value and an average idle duration of the NDL being greater than a threshold value.

20. The method of any of clauses 15-19, where the congestion and throughput measured during each of the plurality of NAN slots indicates an amount of time ($T_{idle}$) that the wireless channel is idle during the respective NAN slot, the average idle duration of the NDL being equal to a mean of $T_{idle}$.

21. The method of any of clauses 15-20, where the dynamic updating of the NDL schedule includes:

adjusting a periodicity of the NAN slots, per DW interval, during which the NDL is available for data communications with the NAN device based on a standard deviation of $T_{load}$.

22. The method of any of clauses 15-21, where the adjusting of the periodicity of the NAN slots includes:

increasing the periodicity of the NAN slots based on Load being less than or equal to the standard deviation of $T_{load}$.

23. The method of any of clauses 15-22, where the adjusting of the periodicity of the NAN slots includes:

reducing the periodicity of the NAN slots based on $T_{load}$ being greater than the standard deviation of $T_{load}$.

24. The method of any of clauses 15-23, where the dynamic updating of the NDL schedule includes:

obtaining the number of NAN slots, per DW interval, during which the NDL is available for data communications with the NAN device based on a joint estimation metric associated with $T_{busy}$ and $T_{load}$.

25. The method of any of clauses 15-24, where the number of NAN slots is obtained from a look-up table (LUT) that stores a plurality of values associated with the joint estimation metric and information indicating a respective number of NAN slots associated with each of the plurality of values.

26. The method of any of clauses 15-25, further including:

listening for incoming data from the NAN device during one or more NAN slots not indicated by the NDL schedule.

27. The method of any of clauses 15-26, where the dynamic updating of the NDL schedule includes:

adjusting the number of NAN slots, per DW interval, during which the NDL is available for data communications with the NAN device based on detecting incoming data from the NAN device during the one or more NAN slots not indicated by the NDL schedule.

28. A wireless communication device including:

at least one modem;

at least one processor communicatively coupled with the at least one modem; and at least one memory communicatively coupled with the at least one processor and storing processor-readable code that, when executed by the at least one processor in conjunction with the at least one modem, is configured to perform the method of any one or more of clauses 15-27.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, comprising:

establishing a neighbor awareness networking (NAN) device link (NDL), over a wireless channel, with a NAN device;

negotiating, with the NAN device, an NDL schedule indicating a number of NAN slots, per discovery window (DW) interval, during which the NDL is available for data communications with the NAN device;

measuring congestion on the wireless channel during each of a plurality of NAN slots within a DW interval, the congestion measured during each NAN slot being associated with an amount of time (Tbusy) that the wireless channel is busy during the respective NAN slot;

measuring throughput on the NDL during each of the plurality of NAN slots. the throughput measured during each NAN slot being associated with an amount of time (Tload) that the wireless communication device communicates with the NAN device, over the NDL, during the respective NAN slot; and dynamically updating the NDL schedule based on the congestion measured during the plurality of NAN slots and based on the throughput measured during the plurality of NAN slots, the dynamic updating comprising adjusting the number of NAN slots, per DW interval, during which the NDL is available for data communications with the NAN device based on a covariance of Tbusy and Tload.

2. The method of claim 1, wherein the adjusting of the number of NAN slots comprises:

increasing the number of NAN slots based on the covariance of Tbusy and Tload being a negative value.

3. The method of claim 1, wherein the adjusting of the number of NAN slots comprises:

reducing the number of NAN slots based on the covariance of Tbusy and Tload being a positive value and an average idle duration of the NDL being greater than a threshold value.

4. The method of claim 3, wherein the congestion and throughput measured during each of the plurality of NAN slots indicates an amount of time (Tidle) that the wireless channel is idle during the respective NAN slot, the average idle duration of the NDL being equal to a mean of Tidle.

5. The method of claim 1, wherein the dynamic updating of the NDL schedule comprises:

obtaining the number of NAN slots, per DW interval, during which the NDL is available for data communications with the NAN device based on a joint estimation metric associated with Tbusy and Tload.

6. The method of claim 5, wherein the number of NAN slots is obtained from a look-up table (LUT) that stores a plurality of values associated with the joint estimation metric and information indicating a respective number of NAN slots associated with each of the plurality of values.

7. The method of claim 1, further comprising:

listening for incoming data from the NAN device during one or more NAN slots not indicated by the NDL schedule.

8. The method of claim 7, wherein the dynamic updating of the NDL schedule comprises:

adjusting the number of NAN slots, per DW interval, during which the NDL is available for data communications with the NAN device based on detecting incoming data from the NAN device during the one or more NAN slots not indicated by the NDL schedule.

9. A wireless communication device comprising:

at least one modem;

at least one processor communicatively coupled with the at least one modem; and at least one memory communicatively coupled with the at least one processor and storing processor-readable code that, when executed by the at least one processor in conjunction with the at least one modem, is configured to:

establish a neighbor awareness networking (NAN) device link (NDL), over a wireless channel, with a NAN device;

negotiate, with the NAN device, an NDL schedule indicating a number of NAN slots, per discovery window (DW) interval, during which the NDL is available for data communications with the NAN device;

measure congestion on the wireless channel during each of a plurality of NAN slots within a DW interval, the congestion measured during each NAN slot being associated with a respective amount of time (Tbusy) that the wireless channel is busy during the respective NAN slot;

measure throughput on the NDL during each of the plurality of NAN slots, the throughput measured during each NAN slot being associated with an amount of time (Tload) that the wireless communication device communicates with the NAN device, over the NDL, during the respective NAN slot; and dynamically update the NDL schedule based on the congestion measured during the plurality of NAN slots and based on the throughput measured during the plurality of NAN slots, the dynamic updating comprising adjusting the number of NAN slots, per DW interval, during which the NDL is available for data communications with the NAN device based on a covariance of Tbusy and Tload.

10. A method for wireless communication by a wireless communication device, comprising:

establishing a neighbor awareness networking (NAN) device link (NDL) with a NAN device;

negotiating, with the NAN device, an NDL schedule indicating a number of NAN slots, per discovery window (DW) interval, during which the NDL is available for data communications with the NAN device;

measuring throughput on the NDL during each of a plurality of NAN slots within a DW interval, the throughput measured during each NAN slot being associated with an amount of time (Tload) that the wireless communication device communicates with the NAN device, over the NDL, during the respective NAN slot;

measuring congestion on a wireless channel associated with the NDL during each of the plurality of NAN slots, the congestion measured during each NAN slot being associated with an amount of time (Tbusy) that the wireless channel is busy during the respective NAN slot; and dynamically updating the NDL schedule based on the throughput measured during the plurality of NAN slots and based on the congestion measured during the plurality of NAN slots, the dynamic updating comprising adjusting a periodicity of the NAN slots, per DW interval, during which the NDL is available for data communications with the NAN device based on a standard deviation of Tload.

11. The method of claim 10, wherein the adjusting of the periodicity of the NAN slots comprises:

increasing the periodicity of the NAN slots based on Tload being less than or equal to the standard deviation of Tload.

12. The method of claim 10, wherein the adjusting of the periodicity of the NAN slots comprises:

reducing the periodicity of the NAN slots based on Tload being greater than the standard deviation of Tload.

13. The method of claim 10, wherein the dynamic updating of the NDL schedule comprises:

obtaining the number of NAN slots, per DW interval, during which the NDL is available for data communications with the NAN device based on a joint estimation metric associated with Tbusy and Tload.

14. The method of claim 13, wherein the number of NAN slots is obtained from a look-up table (LUT) that stores a plurality of values associated with the joint estimation metric and information indicating a respective number of NAN slots associated with each of the plurality of values.

15. The method of claim 10, further comprising:

listening for incoming data from the NAN device during one or more NAN slots not indicated by the NDL schedule.

16. The method of claim 15, wherein the dynamic updating of the NDL schedule comprises:

adjusting the number of NAN slots, per DW interval, during which the NDL is available for data communications with the NAN device based on detecting incoming data from the NAN device during the one or more NAN slots not indicated by the NDL schedule.

17. A wireless communication device comprising:

at least one modem;

at least one processor communicatively coupled with the at least one modem; and at least one memory communicatively coupled with the at least one processor and storing processor-readable code that, when executed by the at least one processor in conjunction with the at least one modem, is configured to:

establish a neighbor awareness networking (NAN) device link (NDL) with a NAN device;

negotiate, with the NAN device, an NDL schedule indicating a number of NAN slots, per discovery window (DW) interval, during which the NDL is available for data communications with the NAN device;

measure throughput on the NDL during each of a plurality of NAN slots within a DW interval, the throughput measured during each NAN slot being associated with an amount of time (Tload) that the wireless communication device communicates with the NAN device, over the NDL, during the respective NAN slot;

measure congestion on a wireless channel associated with the NDL during each of the plurality of NAN slots, the congestion measured during each NAN slot being associated with an amount of time (Tbusy) that the wireless channel is busy during the respective NAN slot; and dynamically update the NDL schedule based on the throughput measured during the plurality of NAN slots and based on the congestion measured during the plurality of NAN slots, the dynamic updating comprising adjusting a periodicity of the NAN slots, per DW interval, during which the NDL is available for data communications with the NAN device based on a standard deviation of Tload.

18. The wireless communication device of claim 17, wherein, to adjust the periodicity of the NAN slots, execution of the processor-readable code is further configured to:

increase the periodicity of the NAN slots based on Tload being less than or equal to the standard deviation of Tload.

19. The wireless communication device of claim 17, wherein to adjust the periodicity of the NAN slots, execution of the processor-readable code is further configured to:

reduce the periodicity of the NAN slots based on Tload being greater than the standard deviation of Tload.

20. The wireless communication device of claim 9, wherein, to adjust the number of NAN slots, execution of the processor-readable code is further configured to:

increase the number of NAN slots based on the covariance of Tbusy and Tload being a negative value.

21. The wireless communication device of claim 9, wherein, to adjust the number of NAN slots, execution of the processor-readable code is further configured to:

reduce the number of NAN slots based on the covariance of Tbusy and Tload being a positive value and an average idle duration of the NDL being greater than a threshold value.

22. The wireless communication device of claim 21, wherein the congestion and throughput measured during each of the plurality of NAN slots indicates an amount of time (Tidle) that the wireless channel is idle during the respective NAN slot, the average idle duration of the NDL being equal to a mean of Tidle.

* * * * *